US012710588B2

(12) United States Patent
Yu et al.

(10) Patent No.: US 12,710,588 B2
(45) Date of Patent: Aug. 18, 2026

(54) PHOTONIC SEMICONDUCTOR DEVICE, PHOTONIC SEMICONDUCTOR PACKAGE USING THE SAME AND MANUFACTURING METHOD THEREOF

(71) Applicant: Taiwan Semiconductor Manufacturing Company, Ltd., Hsinchu (TW)

(72) Inventors: Chih-Hao Yu, Hsinchu (TW); Jui Lin Chao, Hsinchu (TW); Hsing-Kuo Hsia, Hsinchu (TW); Shih-Peng Tai, Hsinchu (TW); Kuo-Chung Yee, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 506 days.

(21) Appl. No.: 18/099,059

(22) Filed: Jan. 19, 2023

(65) Prior Publication Data

US 2024/0118491 A1 Apr. 11, 2024

Related U.S. Application Data

(60) Provisional application No. 63/413,366, filed on Oct. 5, 2022.

(51) Int. Cl.
*G02B 6/12* (2006.01)
*G02B 6/122* (2006.01)
*G02B 6/13* (2006.01)

(52) U.S. Cl.
CPC ....... *G02B 6/1228* (2013.01); *G02B 6/12004* (2013.01); *G02B 6/13* (2013.01); *G02B 2006/12121* (2013.01)

(58) Field of Classification Search
CPC .... G02B 6/1228; G02B 6/12004; G02B 6/13; G02B 2006/12121
See application file for complete search history.

(56) References Cited

U.S. PATENT DOCUMENTS 5,351,329 A * 9/1994 Moore ................. G02B 6/4238 385/92
5,420,722 A * 5/1995 Bielak .................. G02B 6/4204 359/708

(Continued)

OTHER PUBLICATIONS

De Beeck et al., Heterogeneous III-V on silicon nitride amplifiers and lasers via microtransfer printing, Optica 7, 386-393 (2020) (Year: 2020).*
Gardes et al., A Review of Capabilities and Scope for Hybrid Integration Offered by Silicon-Nitride-Based Photonic Integrated Circuits. Sensors 2022, 22, 4227. https://doi.org/10.3390/s22114227, Jun. 1, 2022 (Year: 2022).*

(Continued)

*Primary Examiner* — Peter Radkowski
(74) *Attorney, Agent, or Firm* — Birch, Stewart, Kolasch & Birch, LLP

(57) ABSTRACT

A photonic semiconductor device including a light-emitting component and a photonic integrated circuit is provided. The light-emitting component at least includes a gain medium layer, a first contact layer and a first optical coupling layer stacked to each other. The photonic integrated circuit includes a second optical coupling layer. The light-emitting component and the photonic integrated circuit are stacked in a stacking direction, the first optical coupling layer has a first taper portion, the second optical coupling layer has a second taper portion, and the first taper portion and the second taper portion overlap in the stacking direction. Accordingly, the light emitted from the gain medium layer may be transmitted to the second taper portion from the first taper portion by optical coupling in a short length of an optical coupling path.

20 Claims, 23 Drawing Sheets

(56) References Cited

U.S. PATENT DOCUMENTS 6,075,914 A * 6/2000 Yeandle .................. G02B 6/30 385/49
6,095,697 A * 8/2000 Lehman ................ G02B 6/423 385/91
6,450,699 B1 * 9/2002 Murali ................... H01L 24/73 385/88
6,825,567 B1 * 11/2004 Wang ..................... H01L 24/28 257/E21.705
6,860,648 B2 * 3/2005 Jin ...................... G02B 6/4225 385/88
6,866,426 B1 * 3/2005 Steinberg .............. G02B 6/423 385/83
6,921,968 B2 * 7/2005 Chung ................... H01L 24/91 257/E23.101
6,985,506 B2 * 1/2006 Lissotschenko .... H01S 5/02326 372/101
7,062,144 B2 * 6/2006 Hwang ................. G02B 6/423 385/139
7,239,767 B2 * 7/2007 Kim ........................ G02B 6/42 385/32
7,271,461 B2 * 9/2007 Dutta ..................... H01L 24/17 257/432
7,385,283 B2 * 6/2008 Wu .................... H01L 21/6835 257/691
7,411,281 B2 * 8/2008 Zhang ..................... H01L 23/36 257/E23.101
7,465,408 B1 * 12/2008 Avanzino .......... H01L 21/02074 252/79.1
7,842,607 B2 * 11/2010 Tay .................... H01L 25/0657 438/584
7,943,414 B2 * 5/2011 Shimomura ...... H01L 21/76254 438/509
7,964,916 B2 * 6/2011 Or-Bach ................ H10D 88/01 257/353
8,563,396 B2 * 10/2013 Purushothaman .......................... H01L 21/76802 257/E21.563
8,647,983 B2 * 2/2014 Di Cioccio ............. H01L 24/08 438/118
8,697,542 B2 * 4/2014 Pascual .................. H01L 24/94 438/455
8,748,797 B1 * 6/2014 Decker ..................... H03F 3/08 250/214 R
8,913,356 B2 * 12/2014 Artieri .................... H01L 25/18 361/56
9,229,169 B2 * 1/2016 Doany .................. H01L 21/302
9,240,374 B2 * 1/2016 Shao ................. H01L 21/76814
9,728,453 B2 * 8/2017 Tseng ................ H01L 21/76895
9,728,521 B2 * 8/2017 Tsai ........................ H01L 24/08
9,829,626 B2 * 11/2017 Shubin ................. G02B 6/1228
9,995,895 B2 * 6/2018 Hofrichter .............. H01S 5/005
10,025,047 B1 * 7/2018 Liu .......................... H05K 1/11
10,074,562 B2 * 9/2018 Orozco-Teran ...... H10D 64/258
10,082,633 B2 * 9/2018 Schaevitz ............ G02B 6/4228
10,096,542 B2 * 10/2018 Lee .................. H01L 23/49894
10,103,171 B2 * 10/2018 Blatchford ........ H01L 21/31144
10,267,990 B1 * 4/2019 Yu .......................... H05K 1/181
10,290,571 B2 * 5/2019 Yu ........................... H01L 24/20
10,355,036 B2 * 7/2019 Ando .................... H10F 39/802
10,371,893 B2 * 8/2019 Yu ......................... H01L 23/147
10,381,298 B2 * 8/2019 Yu ....................... H01L 21/6835
10,431,582 B2 * 10/2019 Fu ........................ H10D 84/853
10,522,449 B2 * 12/2019 Chen .................. H01L 25/0657
10,598,875 B2 * 3/2020 Xie ...................... G02B 6/4292
10,685,910 B2 * 6/2020 Yu ......................... H01L 21/568
10,714,457 B2 * 7/2020 Yu ..................... H01L 23/49827
10,727,161 B2 * 7/2020 Smeys .............. H01L 23/49541
10,741,553 B2 * 8/2020 Fu ........................ H10D 62/299
10,748,841 B2 * 8/2020 Chen .................. H01L 21/6835
10,770,490 B2 * 9/2020 Ando ...................... H01L 24/09
10,818,596 B2 * 10/2020 Yang ................. H01L 21/76892
10,854,568 B2 * 12/2020 Chen ....................... H01L 24/82
10,971,443 B2 * 4/2021 Yu ..................... H01L 23/49827
10,985,118 B2 * 4/2021 Koren ................. H01L 23/3672
11,037,817 B2 * 6/2021 Pancholi ................. H01L 24/17
11,037,916 B2 * 6/2021 Pancholi ............... H01L 21/187
11,067,754 B2 * 7/2021 Kimerling ................ G02B 6/43
11,305,372 B2 * 4/2022 Di Cioccio ............. H01L 24/06
11,342,309 B2 * 5/2022 Yu ......................... H01L 21/568
11,469,166 B2 * 10/2022 Chen .................... H05K 3/4682
11,482,509 B2 * 10/2022 You ......................... H01L 25/18
11,527,465 B2 * 12/2022 Yu ....................... H01L 23/5383
11,552,076 B2 * 1/2023 Fu ........................ H10D 62/299
11,610,858 B2 * 3/2023 Chen ....................... H01L 24/09
11,610,993 B2 * 3/2023 Gardner .................. H01L 24/20
11,626,363 B2 * 4/2023 Haba ........................ H01G 2/02 361/301.4
11,901,281 B2 * 2/2024 Haba ........................ H01L 25/16
11,948,831 B2 * 4/2024 Pancholi ............... H01L 21/762
11,990,474 B2 * 5/2024 Fu ...................... H10D 84/0188
12,057,383 B2 * 8/2024 Haba ......................... H01G 4/30
12,293,991 B2 * 5/2025 Yu ......................... H01L 23/481
2005/0100264 A1 * 5/2005 Kim ........................ G02B 6/42 385/14
2005/0280141 A1 * 12/2005 Zhang ................. H01L 23/3128 257/E23.101
2006/0251360 A1 * 11/2006 Lu ........................ G02B 6/4292 385/88
2007/0297713 A1 * 12/2007 Lu ........................ G02B 6/4246 385/14
2008/0182364 A1 * 7/2008 Zhang ................. H01L 23/3128 257/E23.101
2008/0233710 A1 * 9/2008 Hsu ....................... H01L 23/522 438/455
2010/0013102 A1 * 1/2010 Tay ....................... H01L 23/525 257/E23.141
2010/0029058 A1 * 2/2010 Shimomura ........ H01L 21/2007 257/E21.568
2010/0295136 A1 * 11/2010 Or-Bach ................ H10D 88/01 257/390
2010/0327424 A1 * 12/2010 Braunisch ........... H01L 25/0655 257/692
2011/0019960 A1 * 1/2011 Matsubara ........... G02B 6/4214 385/14
2011/0044367 A1 * 2/2011 Budd .................... H10F 39/107 257/E31.127
2012/0039004 A1 * 2/2012 Artieri .................... H01L 23/50 977/932
2012/0100657 A1 * 4/2012 Di Cioccio ......... B81C 1/00269 438/51
2012/0193752 A1 * 8/2012 Purushothaman .......................... H01L 21/76805 257/506
2012/0273940 A1 * 11/2012 Jo ........................... H01L 24/29 257/737
2013/0020589 A1 * 1/2013 Yu ........................ H10H 20/825 257/E33.057
2013/0084039 A1 * 4/2013 Doany .................. H01L 21/302 438/31
2013/0230274 A1 * 9/2013 Fish ....................... G02B 6/305 385/14
2013/0273691 A1 * 10/2013 Pascual ................... H01L 24/97 438/107
2014/0029639 A1 * 1/2014 Zarbock ............... G02B 6/4269 372/50.1
2014/0269804 A1 * 9/2014 Lai ....................... G02B 6/4206 372/50.21
2014/0273347 A1 * 9/2014 Tseng ................ H01L 21/76838 438/107
2015/0097022 A1 * 4/2015 Di Cioccio ............. H01L 24/05 228/173.6
2015/0187700 A1 * 7/2015 Shao ................. H01L 21/76888 257/762
2016/0190156 A1 * 6/2016 Blatchford ........... H10D 84/038 257/203
2016/0252692 A1 * 9/2016 Hofrichter ................ G01J 1/44 250/227.11
2016/0336266 A1 * 11/2016 Orozco-Teran ............................. H01L 21/76831

(56) References Cited

U.S. PATENT DOCUMENTS

| | | | | |
|---|---|---|---|---|
| 2017/0031115 | A1* | 2/2017 | Schaevitz | G02B 6/4228 |
| 2017/0199328 | A1* | 7/2017 | Shubin | G02B 6/1228 |
| 2018/0047767 | A1* | 2/2018 | Ando | H10F 39/80 |
| 2018/0190580 | A1* | 7/2018 | Haba | H01L 23/5223 |
| 2018/0240743 | A1* | 8/2018 | Lee | H01L 23/49894 |
| 2018/0372968 | A1* | 12/2018 | McKay | H01S 5/183 |
| 2019/0057932 | A1* | 2/2019 | Wu | H01L 23/04 |
| 2019/0162901 | A1* | 5/2019 | Yu | H05K 1/112 |
| 2019/0296061 | A1* | 9/2019 | Ando | H10F 99/00 |
| 2019/0317287 | A1* | 10/2019 | Raghunathan | G02B 6/426 |
| 2019/0333803 | A1* | 10/2019 | Pancholi | H01L 21/187 |
| 2019/0333906 | A1* | 10/2019 | Pancholi | H01L 21/187 |
| 2020/0043828 | A1* | 2/2020 | Smeys | H01L 23/315 |
| 2020/0273822 | A1* | 8/2020 | Koren | H01L 25/18 |
| 2020/0279840 | A1* | 9/2020 | Janta-Polczynski | G02B 6/30 |
| 2020/0294908 | A1* | 9/2020 | Haba | H01L 23/5223 |
| 2021/0109290 | A1* | 4/2021 | Kimerling | G02B 6/4228 |
| 2021/0167040 | A1* | 6/2021 | You | H01L 25/50 |
| 2021/0175358 | A1* | 6/2021 | Gardner | H10D 62/121 |
| 2021/0280453 | A1* | 9/2021 | Pancholi | H01L 21/762 |
| 2023/0317591 | A1* | 10/2023 | Haba | H01L 24/08 |
| | | | | 361/301.4 |

OTHER PUBLICATIONS

Kaur et al., Hybrid and heterogeneous photonic integration. APL Photonics Jun. 1, 2021; 6 (6): 061102. https://doi.org/10.1063/5.0052700 (Year: 2021).*

Liang et al., Hybrid Integrated Platforms for Silicon Photonics. Materials 2010, 3, 1782-1802. https://doi.org/10.3390/ma3031782 (Year: 2010).*

Luo et al., Wafer-Scale Dies-Transfer Bonding Technology for Hybrid III/V-on-Silicon Photonic Integrated Circuit Application, in IEEE Journal of Selected Topics in Quantum Electronics, vol. 22, No. 6, pp. 443-454, Nov.-Dec. 2016, Art No. 8200612, doi: 10.1109/JSTQE.2016.2553453. (Year: 2016).*

Moreira, Renan L., Integrated Optical Delay Line Circuits on a Ultra-low Loss Planar Waveguide Platform, Dissertation, UCSB, 2016 (Year: 2016).*

Roelkens et al., III-V/Si photonics by die-to-wafer bonding, Materials Today, vol. 10, Issues 7-8, 2007, pp. 36-43, ISSN 1369-7021, https://doi.org/10.1016/S1369-7021(07)70178-5. (Year: 2007).*

Yao et al., Bridging the gap between resonance and adiabaticity: a compact and highly tolerant vertical coupling structure, Photon. Res. 10, 2081-2090, Jul. 5, 2022 (Year: 2022).*

* cited by examiner

PHOTONIC SEMICONDUCTOR DEVICE, PHOTONIC SEMICONDUCTOR PACKAGE USING THE SAME AND MANUFACTURING METHOD THEREOF

PRIORITY CLAIM AND CROSS-REFERENCE

This application claims the benefit of U.S. provisional application Ser. No. 63/413,366, filed Oct. 5, 2022, the subject matter of which is incorporated herein by reference.

BACKGROUND

Electrical signaling and processing are one technique for signal transmission and processing. Optical signaling and processing have been used in increasingly more applications in recent years, particularly due to the use of optical fiber-related applications for signal transmission.

Optical signaling and processing are typically combined with electrical signaling and processing to provide full-fledged applications. For example, optical fibers may be used for long-range signal transmission, and electrical signals may be used for short-range signal transmission as well as processing and controlling. Accordingly, devices integrating optical components and electrical components are formed for the conversion between optical signals and electrical signals, as well as the processing of optical signals and electrical signals. Packages thus may include both optical (photonic) dies including optical devices and electronic dies including electronic devices.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
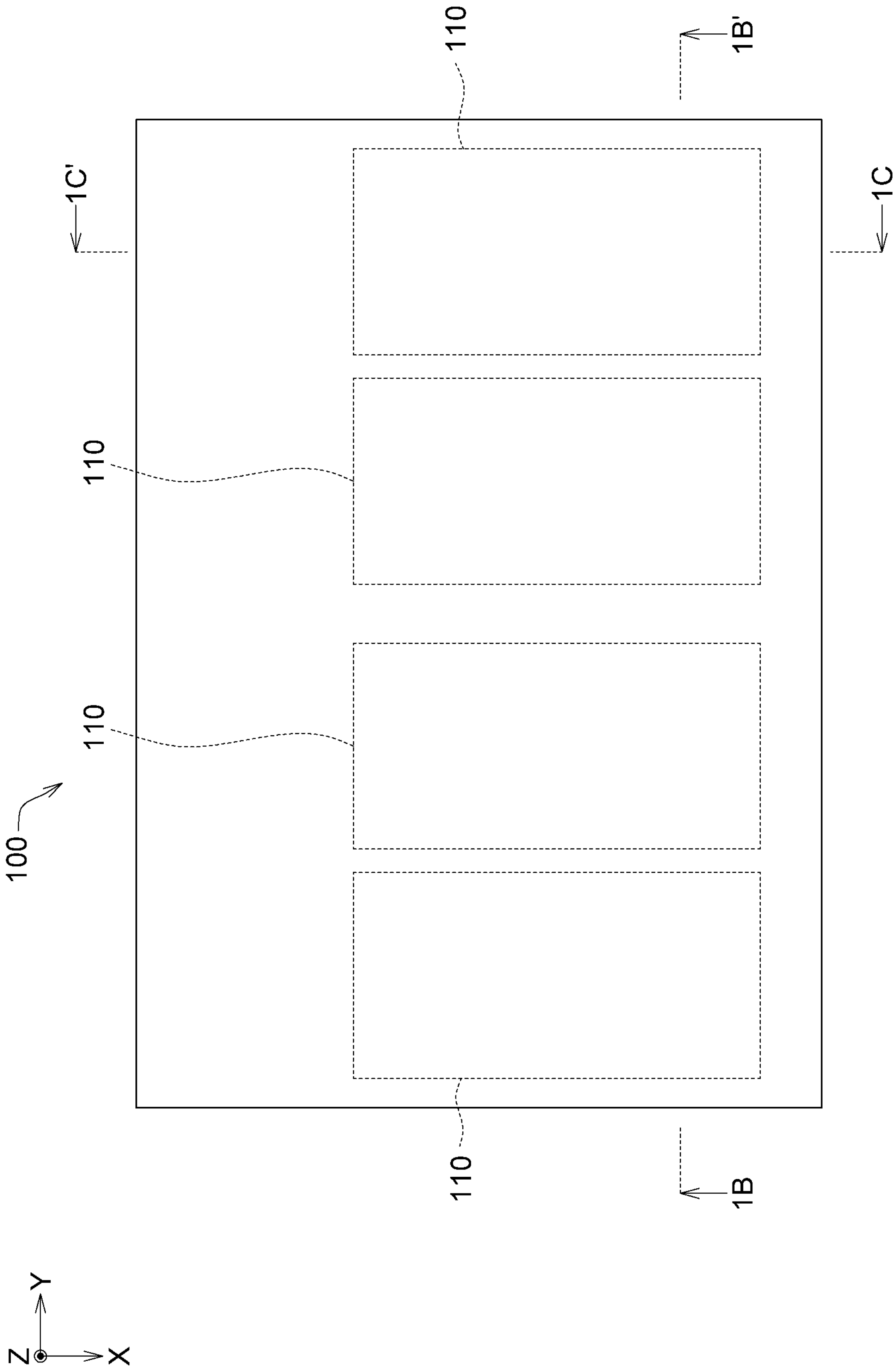
FIG. 1A illustrates schematic diagram of a top view of a photonic semiconductor device according to an embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
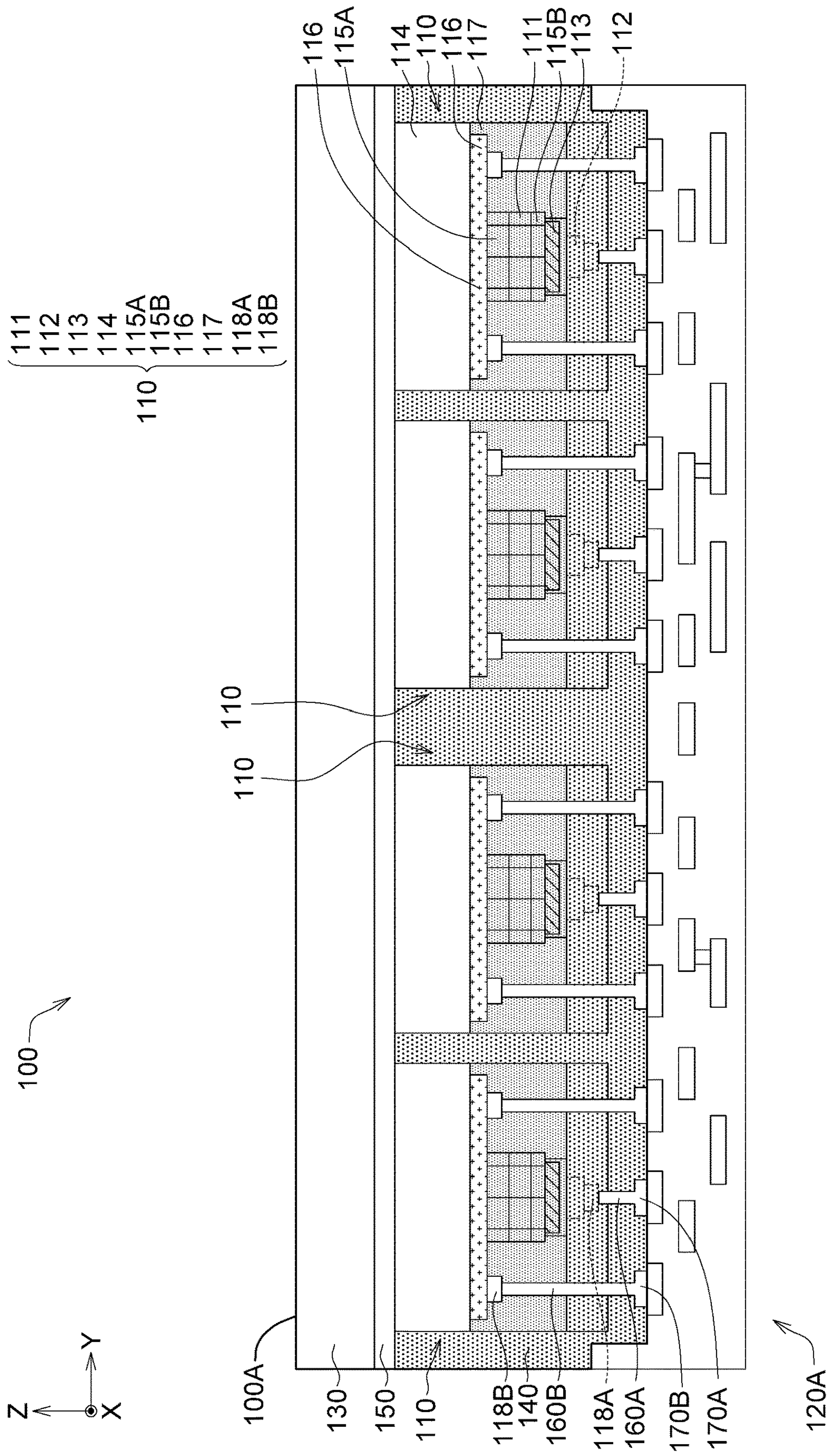
FIG. 1B illustrates schematic diagram of a cross-sectional view of the photonic semiconductor device of FIG. 1A in a direction 1B-1B'.
Figure 1C:
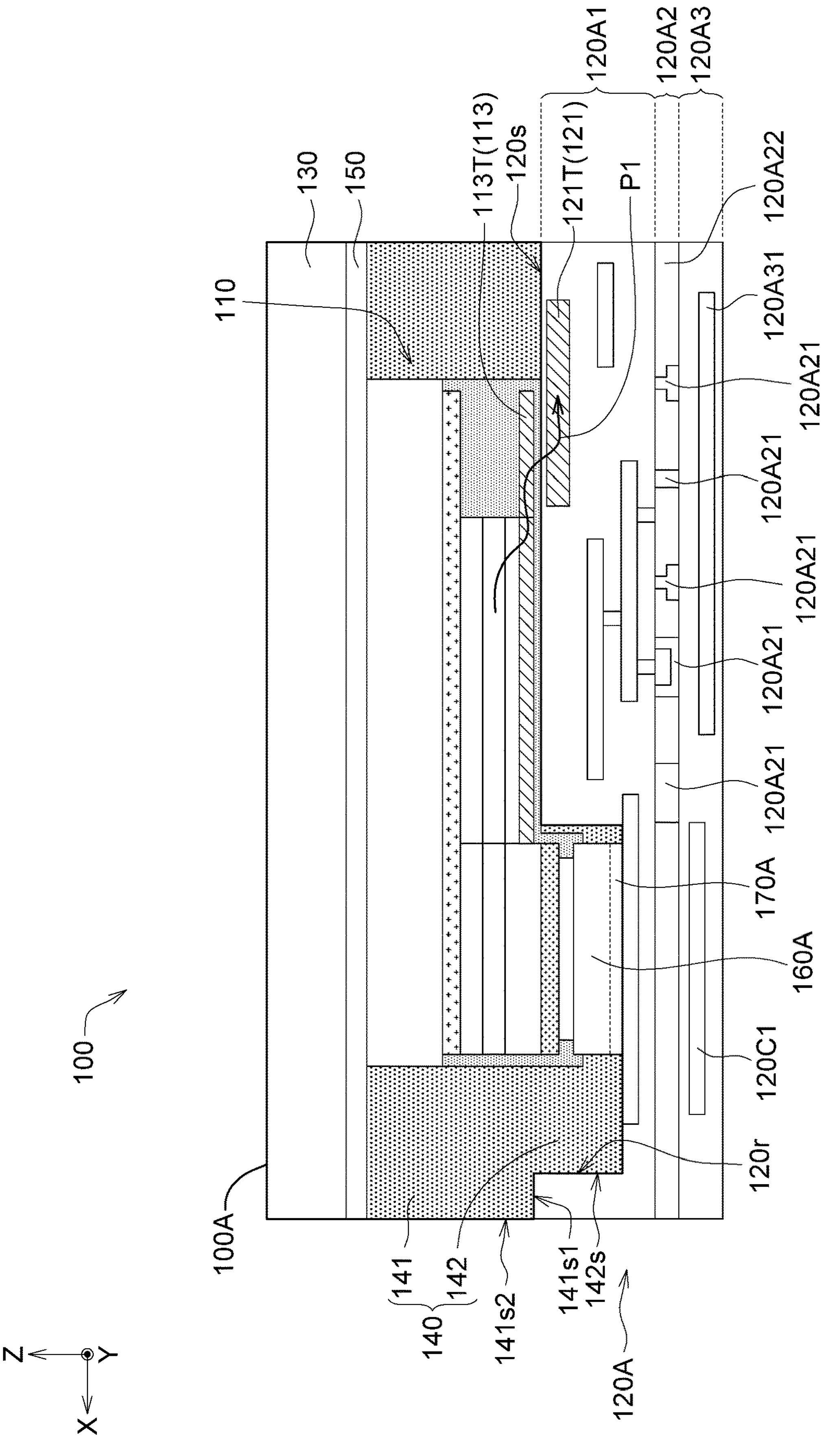
FIG. 1C illustrates a schematic diagram of a cross-sectional view of the photonic semiconductor device of FIG. 1A in a direction 1C-1C'.
Figure 1D:
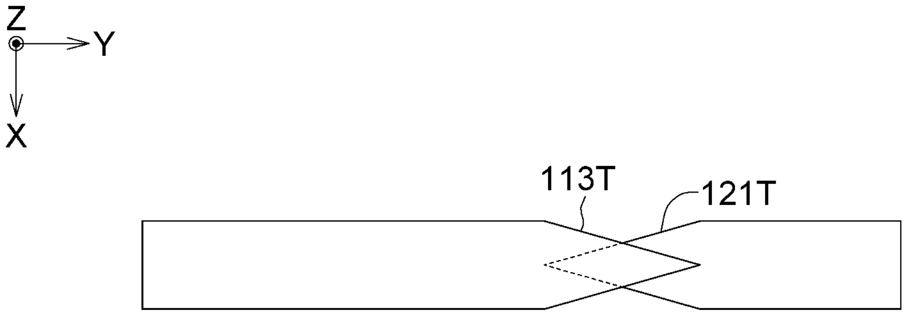
FIG. 1D illustrates a schematic diagram of a first taper portion and a second taper portion of FIG. 1C overlapping.
Figure 2A:
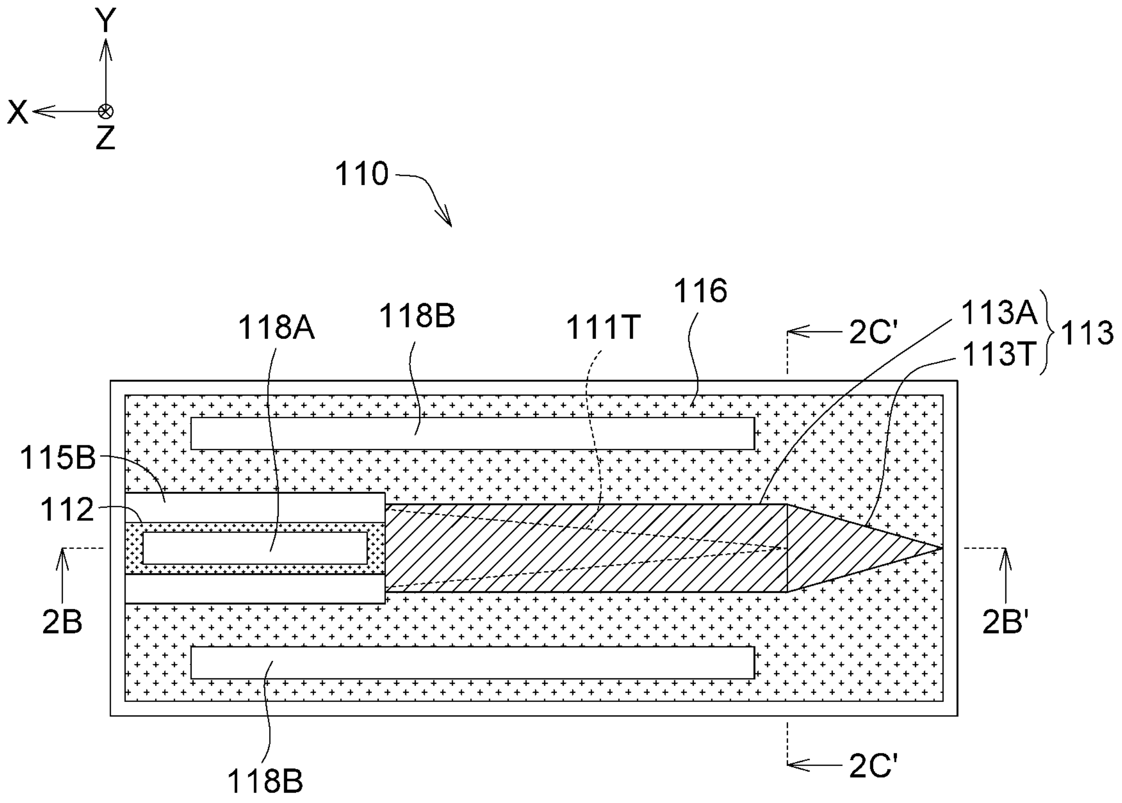
FIG. 2A illustrates a schematic diagram of the light-emitting component of FIG. 1A.
Figure 2B:
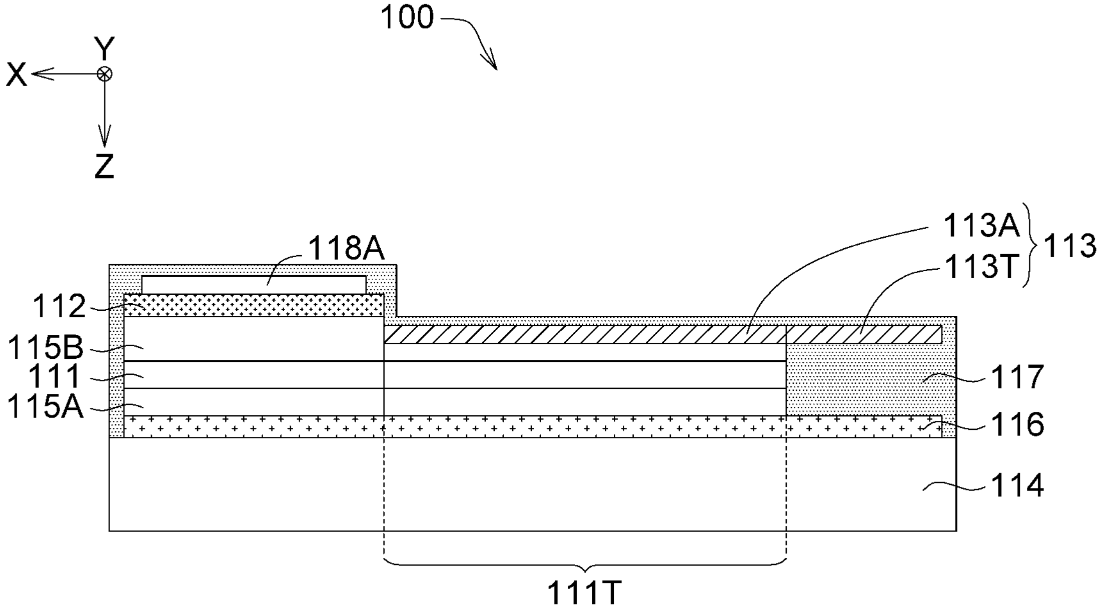
FIG. 2B illustrates a schematic diagram of a cross-sectional view the photonic semiconductor device of FIG. 2A in a direction 2B-2B'.
Figure 2C:
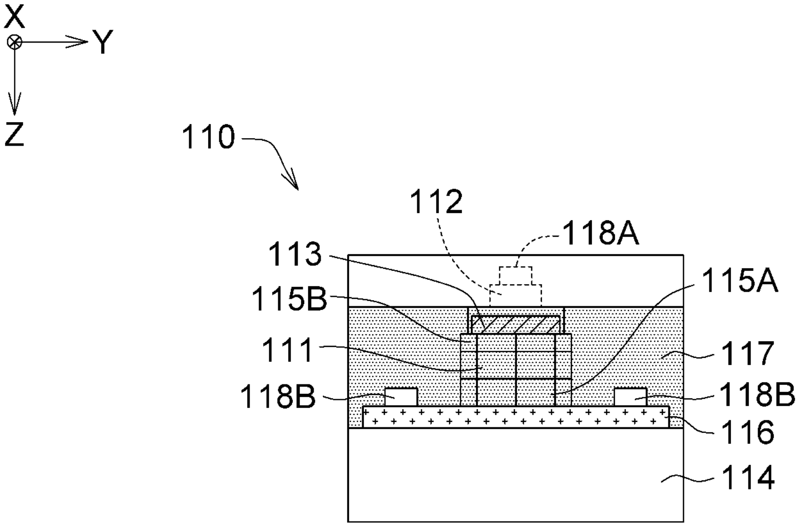
FIG. 2C illustrates a schematic diagram of a cross-sectional view of the photonic semiconductor device of FIG. 2A in a direction 2C-2C'.

Referring to FIGS. 1A to 2C, FIG. 1A illustrates schematic diagram of a top view of a photonic semiconductor device 100 according to an embodiment of the present disclosure, FIG. 1B illustrates schematic diagram of a cross-sectional view of the photonic semiconductor device 100 of FIG. 1A in a direction 1B-1B', FIG. 1C illustrates a schematic diagram of a cross-sectional view of the photonic semiconductor device 100 of FIG. 1A in a direction 1C-1C', FIG. 1D illustrates a schematic diagram of a first taper portion 113T and a second taper portion 121T of FIG. 1C overlapping, FIG. 2A illustrates a schematic diagram of the light-emitting component 110 of FIG. 1A, FIG. 2B illustrates a schematic diagram of a cross-sectional view the photonic semiconductor device 100 of FIG. 2A in a direction 2B-2B', and FIG. 2C illustrates a schematic diagram of a cross-sectional view of the photonic semiconductor device 100 of FIG. 2A in a direction 2C-2C'.

As illustrated in FIGS. 1A to 1D, the photonic semiconductor device 100 includes at least one light-emitting component 110 and a photonic integrated circuit 120A. The light-emitting component 110 includes a gain medium layer 111, a first contact layer 112 and a first optical coupling layer 113 stacked to each other. The photonic integrated circuit 120A includes a second optical coupling layer 121. The light-emitting component 110 and the photonic integrated circuit 120A are stacked in a stacking direction Z, the first optical coupling layer 113 has a first taper portion 113T, the second optical coupling layer 121 has a second taper portion 121T, and the first taper portion 113T and the second taper portion 121T overlap in the stacking direction Z. As a result, the light emitted from the gain medium layer 111 may be transmitted to the second taper portion 121T from the first taper portion 113T by optical coupling in a short length of an optical coupling path.

As illustrated in FIGS. 1C and 1D, the first optical coupling layer 113 is a waveguide layer which may be a medium of light wave. The first taper portion 113T of the first optical coupling layer 113 is a tapered portion and the second taper portion 121T is also a tapered portion. The light traveled within the first taper portion 113T is coupled to the second taper portion 121T by tapered portions. In addition, the first optical coupling layer 113 is formed of a material including, for example, silicon nitride (SiN). Specifically, the first optical coupling layer 113 is a SiN waveguide.

As illustrated in FIGS. 1A and 1B, a plurality of the light-emitting components 110 may be integrated into a light-emitting module 100A. In the present embodiment, the number of the light-emitting components 110 in the light-emitting module 100A is, for example, four; however, such exemplification is not meant to be for limiting. Depends on demand, the number of the light-emitting components 110 in the light-emitting module 100A is may be one, two, three or more than four.

As illustrated in FIGS. 1B and 1C, the light-emitting module 100A includes at least one light-emitting component 110, a carrier 130, an insulation layer 140, a bonding layer 150, at least one first conductive via 160A, at least one second conductive via 160B, at least one first pad 170A and at least one second pad 170B. The light-emitting component 110 of the FIGS. 2A to 2C do not include the first conductive via 160A, the second conductive via 160B, the first pad 170A and the second pad 170B of FIG. 1B. The first conductive via 160A, the second conductive via 160B, the first pad 170A and the second pad 170B are formed during manufacturing processes of the light-emitting module 100A of FIG. 1B.

As illustrated in FIGS. 1B and 1C, the light-emitting components 110 are disposed on the carrier 130 through the bonding layer 150. The insulation layer 140 encapsulates the light-emitting components 110 and includes a first insulation portion 141 and a second insulation portion 142, the second insulation portion 142 protrudes with respect to a surface 141*s*1 of the first insulation portion 141. The second insulation portion 142 is, for example, an island disposed on the first insulation portion 141. Furthermore, the second insulation portion 142 has a first lateral surface 142*s*, wherein the first lateral surface 142*s* is recessed with respect to a second lateral surface 141*s*2 of the first insulation portion 141. The first conductive via 160A passes through the insulation layer 140 to contact with a first pad 118A of the light-emitting components 110. The second conductive via 160B passes through the insulation layer 140 and an insulation layer 117 of the light-emitting component 110 to contact with a second pad 118B of the light-emitting components 110. The first pad 170A connects the first conductive via 160A and exposed from the insulation layer 140 for being electrically connected with the photonic integrated circuit 120A. The second pad 170B connects the second conductive via 160B and exposed from the insulation layer 140 for being electrically connected with the photonic integrated circuit 120A.

As illustrated in FIGS. 1B and 1C, in the present embodiment, the photonic integrated circuit 120A has a recess 120*r*, and the second insulation portion 142 of the insulation layer 140 is located within the recess 120*r*. In addition, the photonic integrated circuit 120A has a surface 120*s*, the recess 120*r* is recessed with respect to the surface 120*s*, the first optical coupling layer 113 and the second optical coupling layer 121 are disposed adjacent to the surface 120*s*. Due to the recess 120*r* receiving the second insulation portion 142, the first optical coupling layer 113 and the second optical coupling layer 121 are allowed to be disposed adjacent to the surface 120*s*.

In an embodiment, the carrier 130 is, for example, silicon substrate. The bonding layer 150 is, for example, an adhesive layer. The insulation layer 140 is formed of a material including, for example, silicon oxide. The first conductive via 160A and the second conductive via 160B are, for example, metal routing, and the first pad 170A and the second pad 170B are, for example, bumps which are formed of a material including, for example, metal.

As illustrated in FIG. 1C, the photonic integrated circuit 120A includes a FEOL (Front End of Line) circuit layer 120A1, a waveguide layer 120A2 and a backside layer 120A3. The waveguide layer 120A2 is formed between the FEOL circuit layer 120A1 and the backside layer 120A3. The FEOL circuit layer 120A1 at least includes the second optical coupling layer 121. The waveguide layer 120A2 includes at least one waveguide 120A21 and an insulation 120A22 surrounds lateral surfaces of the waveguide 120A21. The waveguide 120A21 is, for example, Si waveguides, and the insulation 120A22 is formed of a material including, for example, silicon oxide. The backside layer 120A3 includes at least one waveguide 120A31, for example, SiN waveguide. The optical signal may be transmitted through the waveguides of the FEOL circuit layer 120A1, the waveguide layer 120A2 and the backside layer 120A3.

As illustrated in FIGS. 2B and 2C, the light-emitting component 110 is, for example, a laser diode. Each light-emitting component 110 includes the gain medium layer 111, the first contact layer 112, the first optical coupling layer 113, a substrate 114, at least one first buffer layer 115A, at least one second buffer layer 115B, a second contact layer 116, an insulation layer 117, at least one first pad 118A and at least one second pad 118B. The second contact layer 116, the first buffer layer 115A, the gain medium layer 111 and the second buffer layer 115B are stacked on the substrate 114 in order, the first contact layer 112 and the first optical coupling layer 113 both are formed on the second buffer layer 115B, the first pad 118A is formed on the first contact layer 112, and at least one the second pad 118B is formed on the second contact layer 116. The insulation layer 117 is formed on the substrate 114 and encapsulates the gain medium layer 111, the first contact layer 112, the first optical coupling layer 113, the first buffer layer 115A, the second buffer layer 115B and the second contact layer 116 for protecting these elements.

As illustrated in FIG. 2A, due two second pads 118B being disposed on opposite two sides of the gain medium layer 111, the electrons from the second contact layer 116 may move to the gain medium layer 111 in electrical transmission paths of approximately equal length.

As illustrated in FIGS. 2B and 2C, in the present embodiment, the first contact layer 112 and the first optical coupling layer 113 are located at the same side of the gain medium layer 111.

As illustrated in FIGS. 2B and 2C, in the present embodiment, the first contact layer 112 is, for example, a P-type contact. The second contact layer 116 is, for example, a N-type contact. In the present embodiment, the first contact layer 112 (for example, P-type contact) and the second contact layer 116 (for example, N-type contact) are disposed on the opposite two sides of the first optical coupling layer 113 (for example, the waveguide layer). When voltage is applied to the first contact layer 112 and the second contact layer 116, the electrons move towards the gain medium layer 111 from the second contact layer 116, while the holes move towards the gain medium layer 111 from the first contact layer 112. When the electrons and the holes are combined in the gain medium layer 111, the light-emitting material of the gain medium layer 111 is excited to emit light. The gain medium layer 111 is, for example, a MQW (multi-quantum well) which includes at least one semiconductor layer.

As illustrated in FIGS. 2A and 2B, the gain medium layer 111, the first buffer layer 115A and the second buffer layer 115B form a coupling portion 111T. The light traveled within the coupling portion 111T may be transmitted to the first taper portion 113T by optical coupling. The coupling portion 111T is a tapered portion. The light traveled within the coupling portion 111T is coupled to the first taper portion 113T by tapered portions.

The light travels from the gain medium layer 111 along an optical coupling path P1 (the optical coupling path P1 is illustrated in FIG. 1C): the coupling portion 111T (the coupling portion 111T is illustrated in FIG. 2A) of the light-emitting component 110, the first taper portion 113T (the first taper portion 113T is illustrated in FIG. 1C) of the light-emitting component 110 and the second taper portion 121T (the second taper portion 121T is illustrated in FIG. 1C) of the photonic integrated circuit 120A in order.

As illustrated in FIGS. 2A and 2B, the first optical coupling layer 113 further includes a portion 113A connected with the first taper portion 113T, wherein the portion 113A is formed on the coupling portion 111T. The first taper portion 113T protrudes with respect to the coupling portion 111T in Y-axis for increasing a length of coupling path. The insulation layer 117 may be formed beneath the first taper portion 113T for supporting the first taper portion 113T.

As illustrated in FIGS. 2B and 2C, the light-emitting component 110 may be formed of a material including, for example, III-V based material or II-VI based material. For III-V based material, the gain medium layer 111 is formed of a material including, for example, InAlGaAs, the first contact layer 112 is formed of a material including, for example, InAlAs, the substrate 114 is formed of a material including, for example, InP, the first buffer layer 115A is formed of a material including, for example, InGaAsP, the second buffer layer 115B is formed of a material including, for example, InP, the second contact layer 116 is formed of a material including, for example, InP. For II-VI based material, the gain medium layer 111 is formed of a material including, for example, BeZnCdSe, the first contact layer 112 is formed of a material including, for example, GaAs, the substrate 114 is formed of a material including, for example, GaAs, the first buffer layer 115A is formed of a material including, for example, BeMgZnSe, the second buffer layer 115B is formed of a material including, for example, BeMgZnSe, the second contact layer 116 is formed of a material including, for example, BeTe. In addition, the insulation layer 117 is formed of a material including, for example, silicon oxide, and the first pad 118A and the second pad 118B are formed of a material including, for example, metal.

Figure 3A:
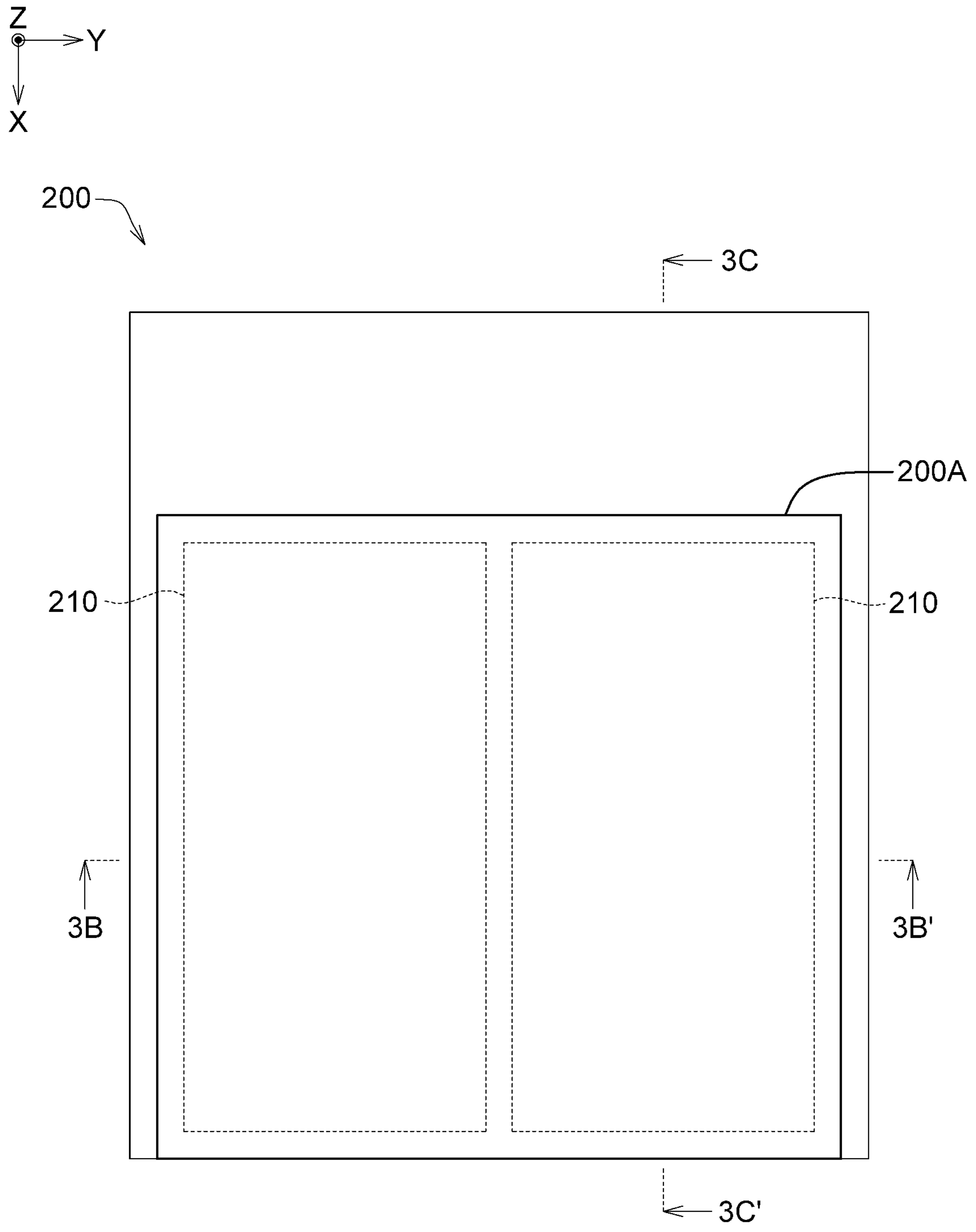
FIG. 3A illustrates schematic diagram of a top view of a photonic semiconductor device according to an embodiment of the present disclosure.
Figure 3B:
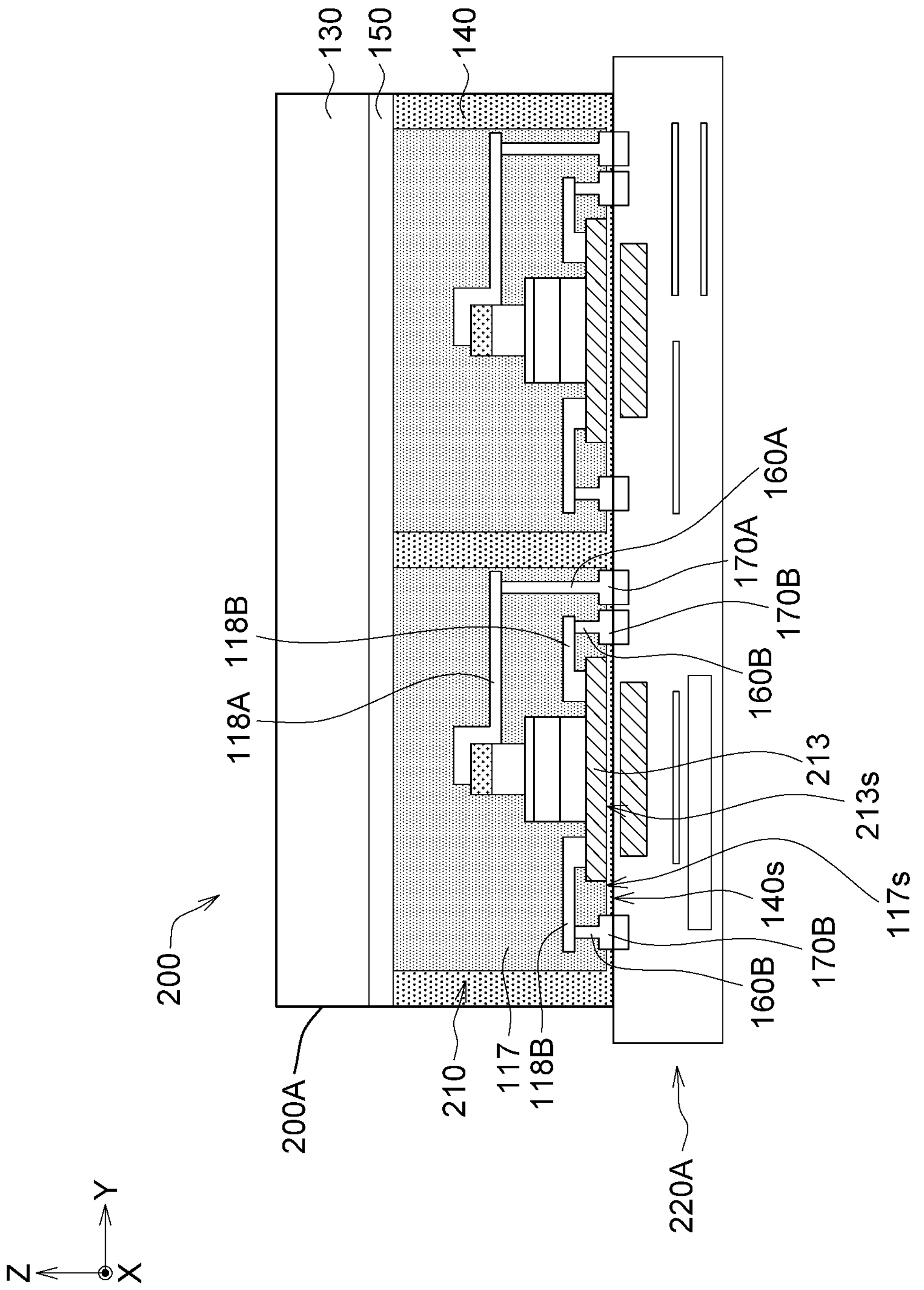
FIG. 3B illustrates schematic diagram of a cross-sectional view of the photonic semiconductor device of FIG. 3A in a direction 3B-3B'.
Figure 3C:
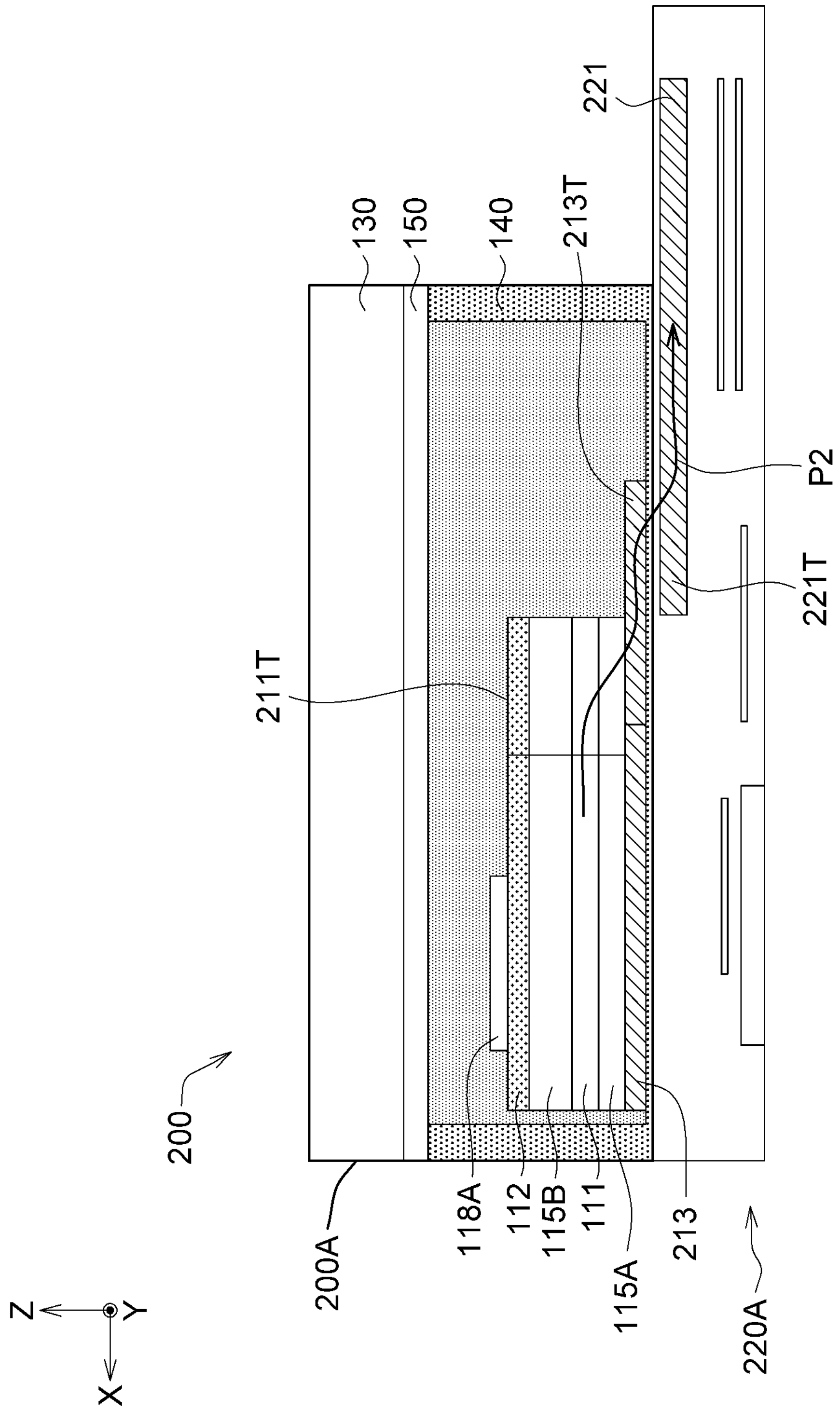
FIG. 3C illustrates a schematic diagram of another cross-sectional view of the photonic semiconductor device of FIG. 3A in a direction 3C-3C'.
Figure 3D:
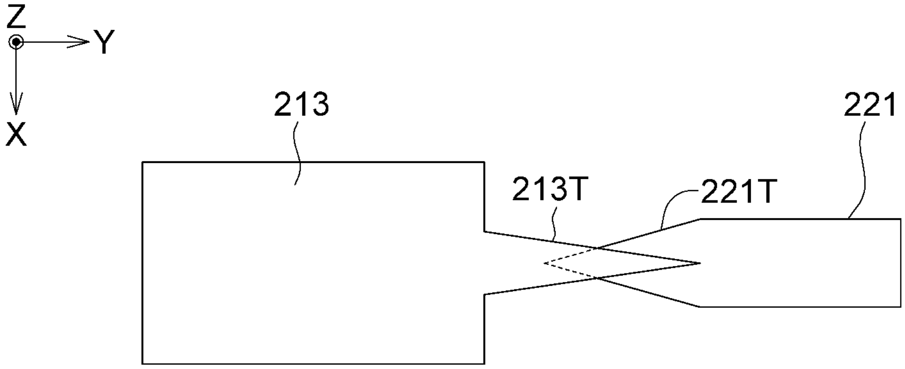
FIG. 3D illustrates a schematic diagram of a first taper portion and a second taper portion of FIG. 3C overlapping.
Figure 4A:
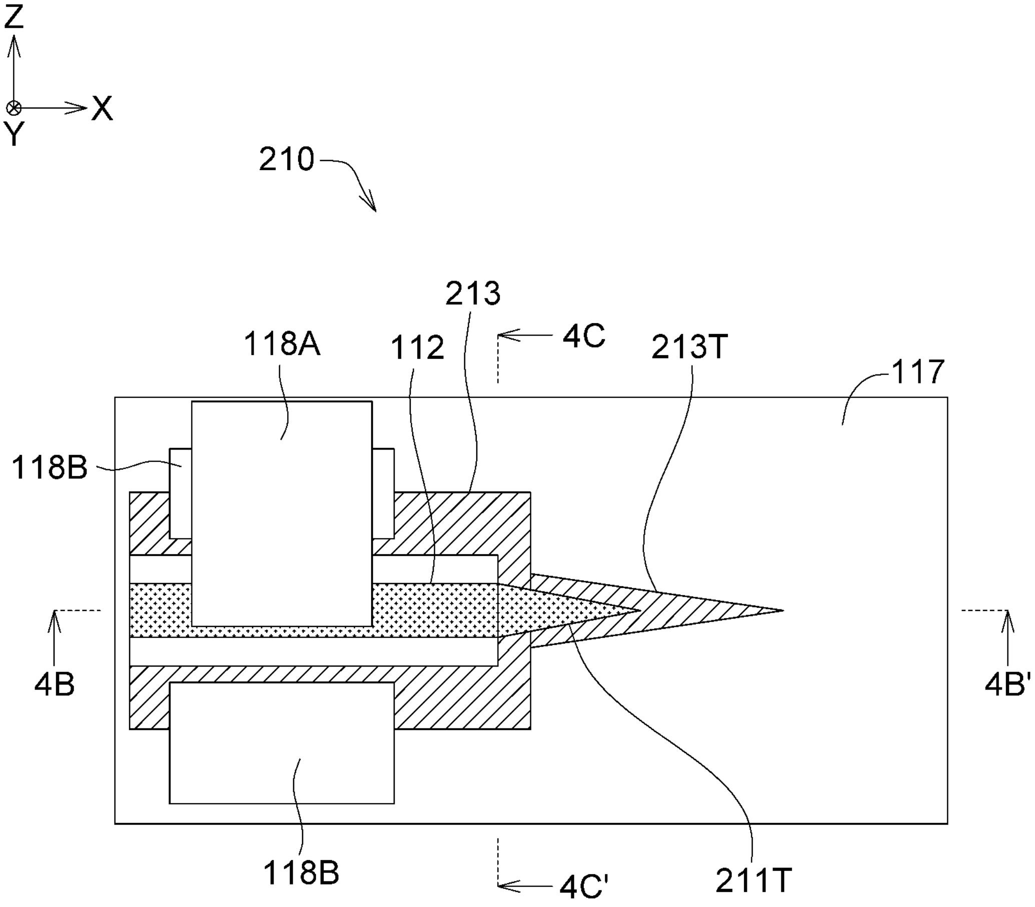
FIG. 4A illustrates a schematic diagram of a light-emitting component of FIG. 3A.
Figure 4B:
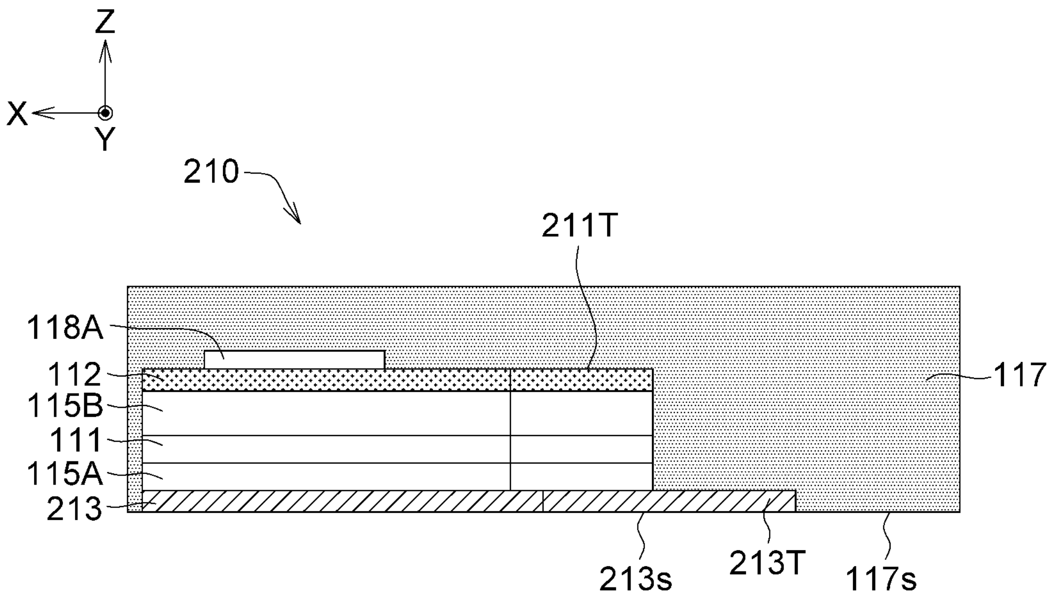
FIG. 4B illustrates a schematic diagram of the photonic semiconductor device of FIG. 4A in a direction 4B-4B'.
Figure 4C:
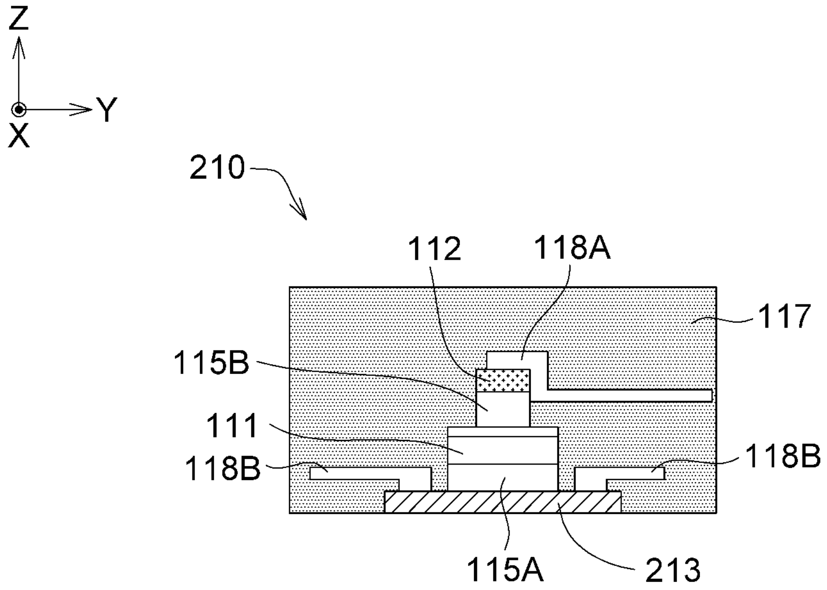
FIG. 4C illustrates a schematic diagram of a cross-sectional view of the photonic semiconductor device of FIG. 4A in a direction 4C-4C'.

Referring to FIGS. 3A to 4C, FIG. 3A illustrates schematic diagram of a top view of a photonic semiconductor device 200 according to an embodiment of the present disclosure, FIG. 3B illustrates schematic diagram of a cross-sectional view of the photonic semiconductor device 200 of FIG. 3A in a direction 3B-3B', FIG. 3C illustrates a schematic diagram of another cross-sectional view of the photonic semiconductor device 200 of FIG. 3A in a direction 3C-3C', FIG. 3D illustrates a schematic diagram of a first taper portion 213T and a second taper portion 221T of FIG. 3C overlapping, FIG. 4A illustrates a schematic diagram of a light-emitting component 210 of FIG. 3A, FIG. 4B illustrates a schematic diagram of the photonic semiconductor device 200 of FIG. 4A in a direction 4B-4B', and FIG. 4C illustrates a schematic diagram of a cross-sectional view of the photonic semiconductor device 200 of FIG. 4A in a direction 4C-4C'.

As illustrated in FIGS. 3A to 3D, the photonic semiconductor device 200 includes at least one light-emitting component 210 and a photonic integrated circuit 220A. The photonic integrated circuit 220A may include the structures similar to or the same as that of the photonic integrated circuit 120A expect that, for example, the photonic integrated circuit 220A may omit the recess 120*r* of the photonic integrated circuit 120A.

The light-emitting component 210 includes the gain medium layer 111, the first contact layer 112 and a first optical coupling layer 213 stacked to each other. The photonic integrated circuit 220A includes a second optical coupling layer 221. The light-emitting component 210 and the photonic integrated circuit 220A are stacked in the stacking direction Z, the first optical coupling layer 213 has a first taper portion 213T, the second optical coupling layer 221 has a second taper portion 221T, and the first taper portion 213T and the second taper portion 221T overlap in the stacking direction Z. As a result, the light emitted from the gain medium layer 111 may be transmitted to the second taper portion 221T from the first taper portion 213T by optical coupling in a short length of an optical coupling path.

As illustrated in FIGS. 3C and 3D, the first optical coupling layer 213 is a waveguide layer which may be a medium of light wave. The first taper portion 213T of the first optical coupling layer 213 is a tapered portion and the second taper portion 221T is also a tapered portion. The light traveled within the first taper portion 213T is coupled to the second taper portion 221T by tapered portions. In addition, the first optical coupling layer 213 is formed of a material including, for example, SiN. Specifically, the first optical coupling layer 213 is a SiN waveguide.

As illustrated in FIGS. 3A and 3B, a plurality of the light-emitting components 210 may be integrated into a light-emitting module 200A. In the present embodiment, the number of the light-emitting components 210 in the light-emitting module 200A is, for example, two; however, such exemplification is not meant to be for limiting. Depends on demand, the number of the light-emitting components 210 in the light-emitting module 200A is may be one or more than two.

As illustrated in FIGS. 3B and 3C, the light-emitting module 200A includes at least one light-emitting component 210, the carrier 130, the insulation layer 140, the bonding layer 150, at least one first conductive via 160A, at least one second conductive via 160B, at least one first pad 170A, at least one second pad 170B. The light-emitting component 210 of the FIGS. 4A to 4C do not include the first conductive via 160A, the second conductive via 160B, the first pad 170A and the second pad 170B of FIG. 3B. The first conductive via 160A, the second conductive via 160B, the first pad 170A and the second pad 170B are formed during manufacturing processes of the light-emitting module 200A.

As illustrated in FIGS. 3B and 3C, the light-emitting components 210 are disposed on the carrier 130 through the bonding layer 150. The insulation layer 140 encapsulates the light-emitting components 210, the first conductive via 160A, the second conductive via 160B, the first pad 170A and the second pad 170B. The first conductive via 160A passes through the insulation layer 117 of the light-emitting component 210 to contact with the first pad 118A of the light-emitting components 210. The second conductive via 160B passes through the insulation layer 117 of the light-emitting component 210 to contact with the second pad 118B of the light-emitting components 210. The first pad 170A connects the first conductive via 160A and exposed from an insulation surface 140*s* of the insulation layer 140 for being electrically connected with the photonic integrated circuit 120A. The second pad 170B connects the second conductive via 160B and exposed from the insulation surface 140*s* of the insulation layer 140 for being electrically connected with the photonic integrated circuit 120A.

As illustrated in FIG. 3B, compared to the light-emitting component 110 of FIG. 2B, the light-emitting component 210 may omit the substrate 114 of FIG. 2B, and the first optical coupling layer 213 is exposed from the light-emitting component 210. Furthermore, the first optical coupling layer 213 is exposed from an insulation surface 117*s* of the insulation layer 117. The first optical coupling layer 213 has a coupling surface 213*s*, and the insulation surface 117*s* and the coupling surface 213*s* are flush with each other.

As illustrated in FIG. 3C, the light from the gain medium layer 111 travels along an optical path P2: the coupling portion 211T of the light-emitting component 210, the first taper portion 213T of the light-emitting component 210 and the second taper portion 121T of the photonic integrated circuit 120A in order.

As illustrated in FIGS. 4B and 4C, the light-emitting component 210 is, for example, a laser diode. Each light-emitting component 210 includes the gain medium layer 111, the first contact layer 112, the first optical coupling layer 113, at least one first buffer layer 115A, at least one second buffer layer 115B, the insulation layer 117, at least one first pad 118A and at least one second pad 118B. The first optical coupling layer 213, the first buffer layer 115A, the gain medium layer 111 and the second buffer layer 115B and the first contact layer 112 are stacked in order, the first pad 118A is formed on the first contact layer 112, and at least one the second pad 118B is formed on the first optical coupling layer 213. The insulation layer 117 encapsulates the gain medium layer 111, the first contact layer 112, the first optical coupling layer 213, the first buffer layer 115A, the second buffer layer 115B, the first pad 118A and the second pad 118B for protecting these elements.

As illustrated in FIGS. 4B and 4C, in the present embodiment, the first contact layer 112 and the first optical coupling layer 213 are located at the opposite two sides of the gain medium layer 111.

As illustrated in FIGS. 4B and 4C, in the present embodiment, the first contact layer 112 is, for example, a P-type contact. The first optical coupling layer 213 is, for example, a N-type contact. In the present embodiment, the first optical coupling layer 213 serves as the N-type contact and the waveguide layer. When voltage is applied to the first contact layer 112 and the second contact layer 116, the electrons move towards the gain medium layer 111 from the first contact layer 112, while the holes move towards the gain medium layer 111 from the second contact layer 116. When the electrons and the holes are combined in the gain medium layer 111, the light-emitting material of the gain medium layer 111 is excited to emit light. The gain medium layer 111 is, for example, a MQW (multi-quantum well) which includes at least one semiconductor layer.

As illustrated in FIGS. 4A to 4B, the gain medium layer 111, the first contact layer 112, the first buffer layer 115A and the second buffer layer 115B form a coupling portion 211T. The light traveled within the coupling portion 211T may be transmitted to the first taper portion 213T by optical coupling. The coupling portion 211T is a tapered portion. The light traveled within the coupling portion 211T is coupled to the first taper portion 213T by tapered portions. In addition, the first taper portion 213T protects with respect to the coupling portion 211T in X-axis for increasing a length of coupling path.

Figure 5:
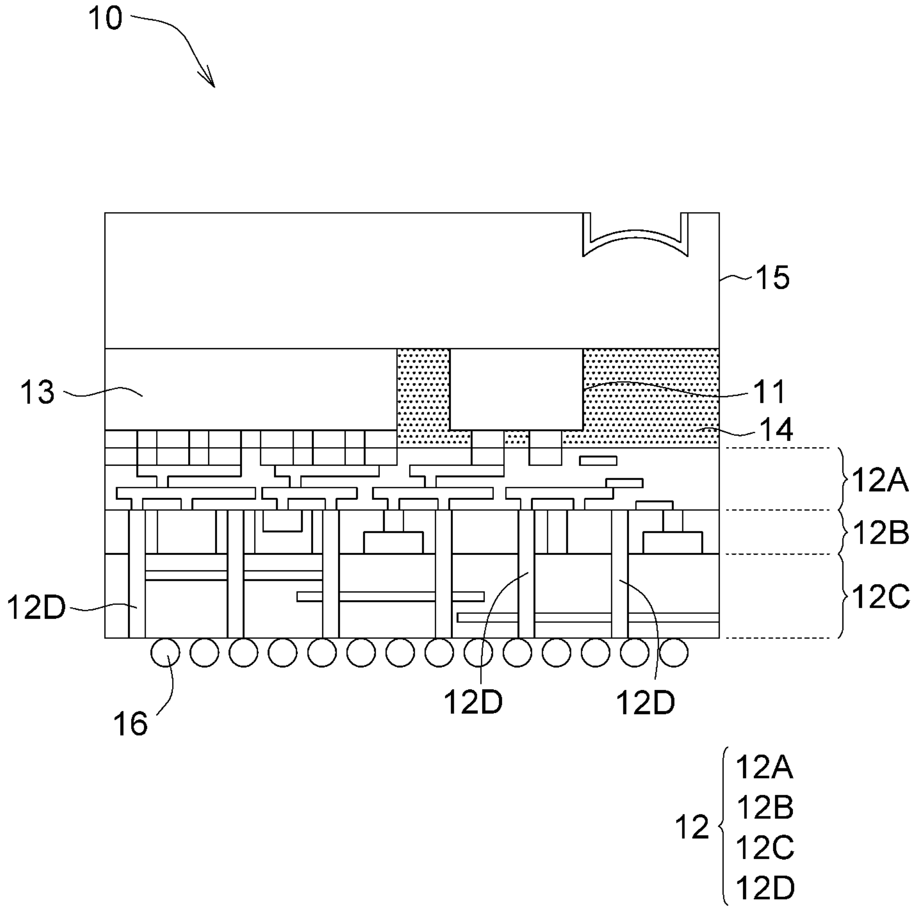
FIG. 5 illustrates a schematic diagram of a cross-sectional view of a photonic semiconductor package according to an embodiment of the present disclosure.

Referring to FIG. 5, FIG. 5 illustrates a schematic diagram of a cross-sectional view of a photonic semiconductor package 10 according to an embodiment of the present disclosure. In the present embodiment, the photonic semiconductor package 10 is, for example, a Co-Packaged Optics (CPO).

As illustrated in FIG. 5, the photonic semiconductor package 10 includes at least one light-emitting component 11, a photonic integrated circuit 12, at least one electronic integrated circuit (EIC) 13, an insulation layer 14, an optical lens 15 and at least one contact 16.

As illustrated in FIG. 5, the light-emitting component 11 includes the structures similar to or the same as that of the light-emitting component 110 of FIG. 1B. In an embodiment, the light-emitting component 11 has the structure completely the same as that of the light-emitting component 110. The photonic integrated circuit 12 includes the structures similar to or the same as that of the photonic integrated circuit 120A of FIG. 1B, the insulation layer 14 includes the structures similar to or the same as that of the insulation layer 140 of FIG. 1B, and the similarities is not repeated here. The optical lens 15 is formed of a material including, for example, silicon. Furthermore, the optical lens 15 is Si lens.

As illustrated in FIG. 5, the photonic integrated circuit 12 includes a FEOL circuit 12A, a waveguide layer 12B, a backside layer 12C and at least one conductive via 12D. The FEOL circuit 12A includes the structures similar to or the same as that of the FEOL circuit 120A. The waveguide layer 12B includes the structures similar to or the same as that of the waveguide layer 12B. The backside layer 12C includes the structures similar to or the same as that of the backside layer 120A3. The conductive via 12D pass through the waveguide layer 12B and the backside layer 12C to electrically connect the FEOL circuit 12A. The contact 16 is disposed beneath the backside layer 12C and electrically connected with the conductive via 12D.

As illustrated in FIG. 5, the light-emitting component 11 and the electronic integrated circuit 13 are disposed on the photonic integrated circuit 12. The insulation layer 14 is formed on the photonic integrated circuit 12 and encapsulates the light-emitting component 11 and the electronic integrated circuit 13. The insulation layer 14 exposes an upper surface of the light-emitting component 11 and an upper surface of the electronic integrated circuit 13. The optical lens 15 is disposed on the insulation layer 14 and the exposed light-emitting component 11 and the photonic integrated circuit 13.

In addition, the photonic semiconductor package 10 may be applied to a Chip On Wafer On Substrate (CoWoS).

Figure 6:
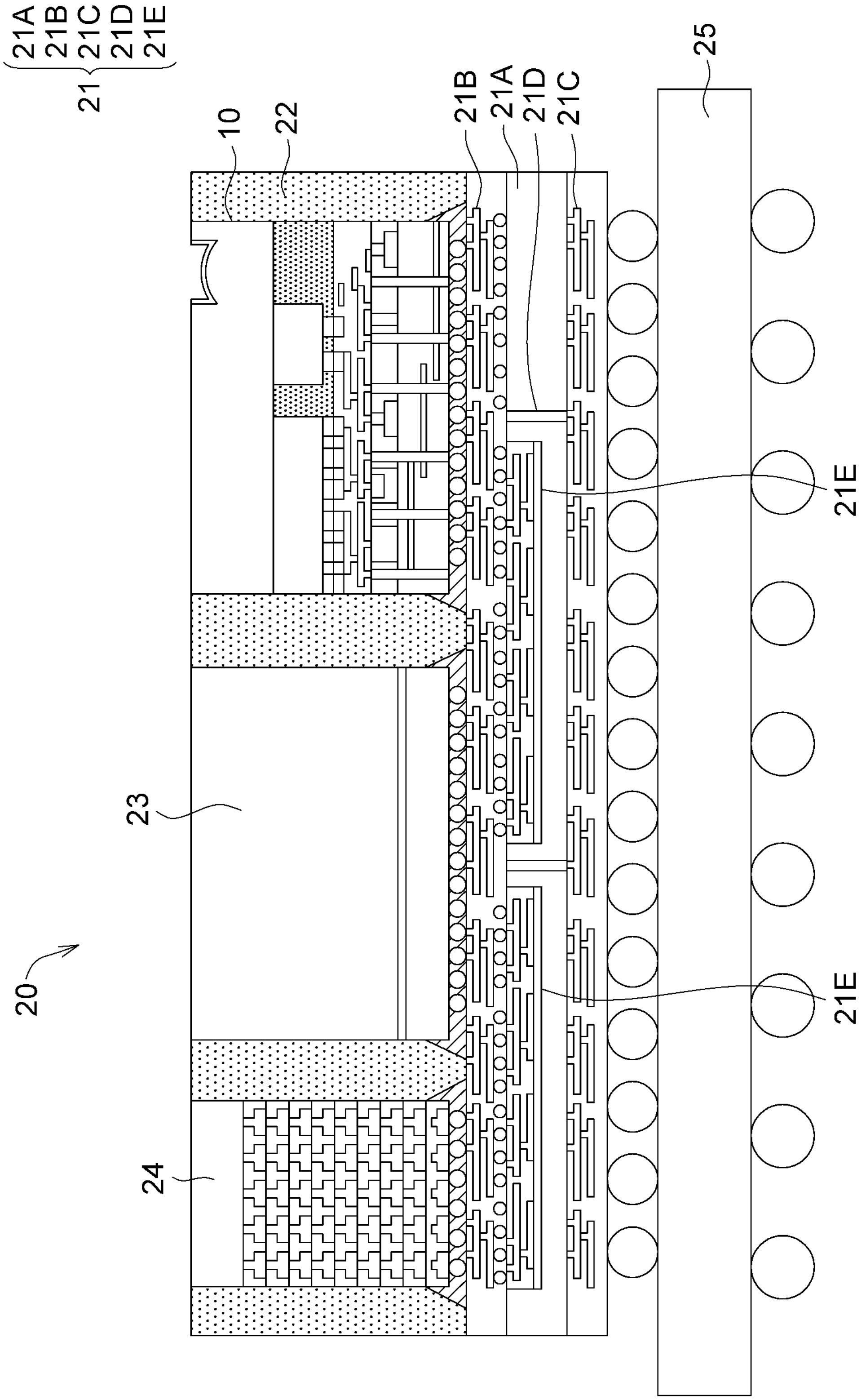
FIG. 6 illustrates a schematic diagram of a cross-sectional view of a photonic semiconductor system according to an embodiment of the present disclosure.

Referring to FIG. 6, FIG. 6 illustrates a schematic diagram of a cross-sectional view of a photonic semiconductor system 20 according to an embodiment of the present disclosure. In the present embodiment, the photonic semiconductor package 10 is applied to the photonic semiconductor system 20 which is, for example, a CoWoS-L based system.

As illustrated in FIG. 6, the photonic semiconductor system 20 includes an interposer 21, a package body 22, at least one photonic semiconductor package 10, at least one semiconductor component 23, at least one memory chip 24 and a substrate 25. The at least one photonic semiconductor package 10, the semiconductor component 23 and the memory chip 24 are disposed on the interposer 21. The package body 22 encapsulates the photonic semiconductor package 10, the semiconductor component 23 and the memory chip 24. The interposer 21 is disposed on the substrate 25. The substrate 25 is, for example, a printed circuit board.

As illustrated in FIG. 6, the interposer 21 includes, for example, an organic core 21A, an upper redistribution layer (RDL) 21B, a lower RDL 21C, at least one conductive via 21D and at least one local silicon interconnection 21E. The upper RDL 21B and the lower RDL 21C are formed on opposite two sides of the organic core 21A, and the conductive via 21D connects the upper RDL 21B and the lower RDL 21C. The silicon interconnection 21E is embedded in the organic core 21A and electrically with the upper RDL 21B, the lower RDL 21C and/or the conductive via 21D.

As illustrated in FIG. 6, the package body 22 is, for example, a molding compound. The semiconductor component 23 is, for example, an application-specific integrated circuit (ASIC). The memory chip 24 is, for example, a dynamic random-access memory (DRAM), a static random-access memory (SRAM), etc.

Figure 7:
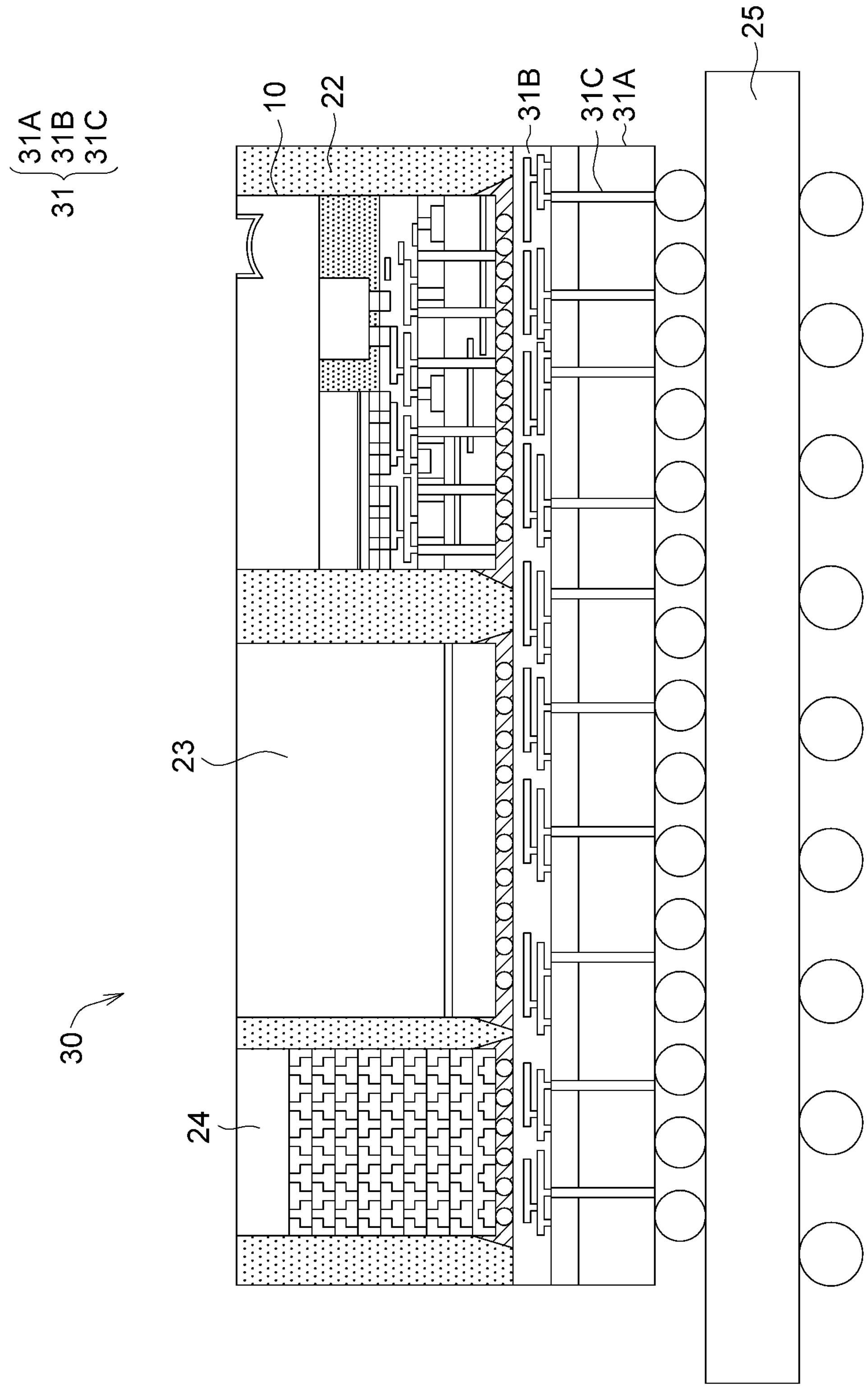
FIG. 7 illustrates a schematic diagram of a cross-sectional view of a photonic semiconductor system according to an embodiment of the present disclosure.

Referring to FIG. 7, FIG. 7 illustrates a schematic diagram of a cross-sectional view of a photonic semiconductor system 30 according to an embodiment of the present disclosure. In the present embodiment, the photonic semiconductor package 10 is applied to the photonic semiconductor system 30 which is, for example, a CoWoS—S based system.

As illustrated in FIG. 7, the photonic semiconductor system 30 includes an interposer 31, the package body 22, at least one photonic semiconductor package 10, at least one semiconductor component 23, at least one memory chip 24 and the substrate 25. The at least one photonic semiconductor package 10, the semiconductor component 23 and the memory chip 24 are disposed on the interposer 31. The package body 22 encapsulates the photonic semiconductor package 10, the semiconductor component 23 and the memory chip 24. The interposer 31 is disposed on the substrate 25.

As illustrated in FIG. 7, the interposer 31 includes, for example, a Si substrate 31A, an upper RDL 31B and at least one conductive via 31C. The Si substrate 31A is, for example, a wafer. The upper RDL 31B is formed on an upper side of the Si substrate 31, and the conductive via 31C is connected with the upper RDL 31B.

Referring to FIGS. 8A to 8D, FIGS. 8A to 8D illustrate schematic diagrams of processes of the photonic semiconductor device 100 of FIG. 1B.

Figure 8A:
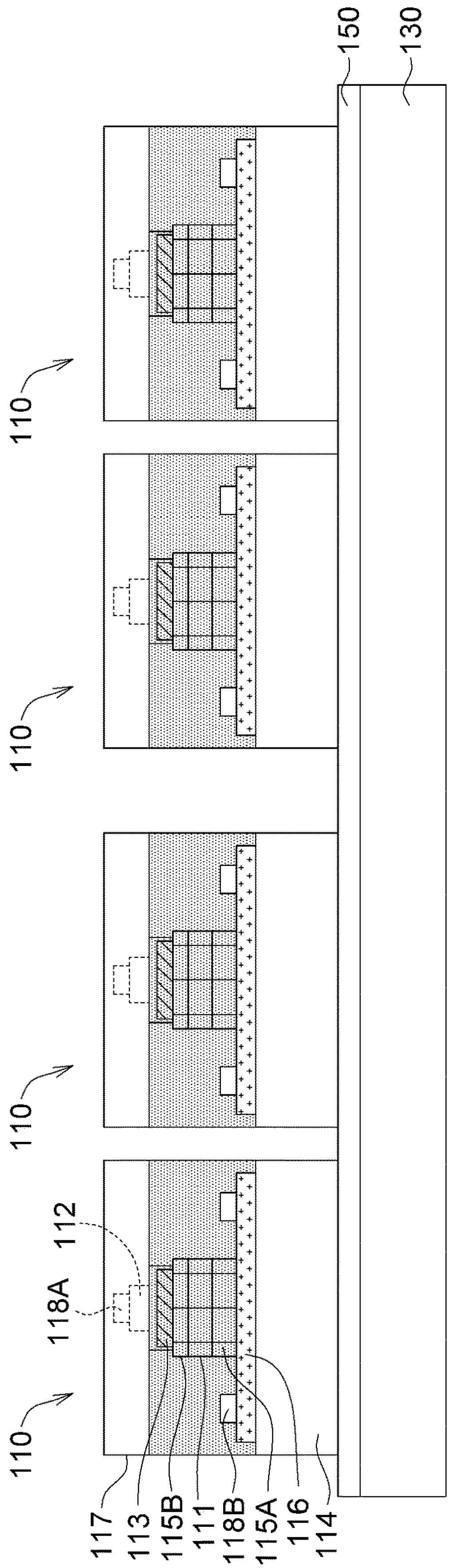
FIGS. 8A to 8D illustrate schematic diagrams of processes of the photonic semiconductor device of FIG. 1B.

As illustrated in FIG. 8A, a plurality of the light-emitting components 110 of FIG. 2C are disposed on the carrier 130 through the bonding layer 150. Each light-emitting component 110 includes the gain medium layer 111, the first contact layer 112, the first optical coupling layer 113, the substrate 114, at least one first buffer layer 115A, at least one second buffer layer 115B, the second contact layer 116, the insulation layer 117, at least one first pad 118A and at least one second pad 118B, wherein the gain medium layer 111, the first contact layer 112, the first optical coupling layer 113, at least one first buffer layer 115A, at least one second buffer layer 115B, the second contact layer 116, the insulation layer 117, at least one first pad 118A and at least one second pad 118B are disposed on the substrate 114. The first optical coupling layer 113 has a first taper portion 113T.

Figure 8B:
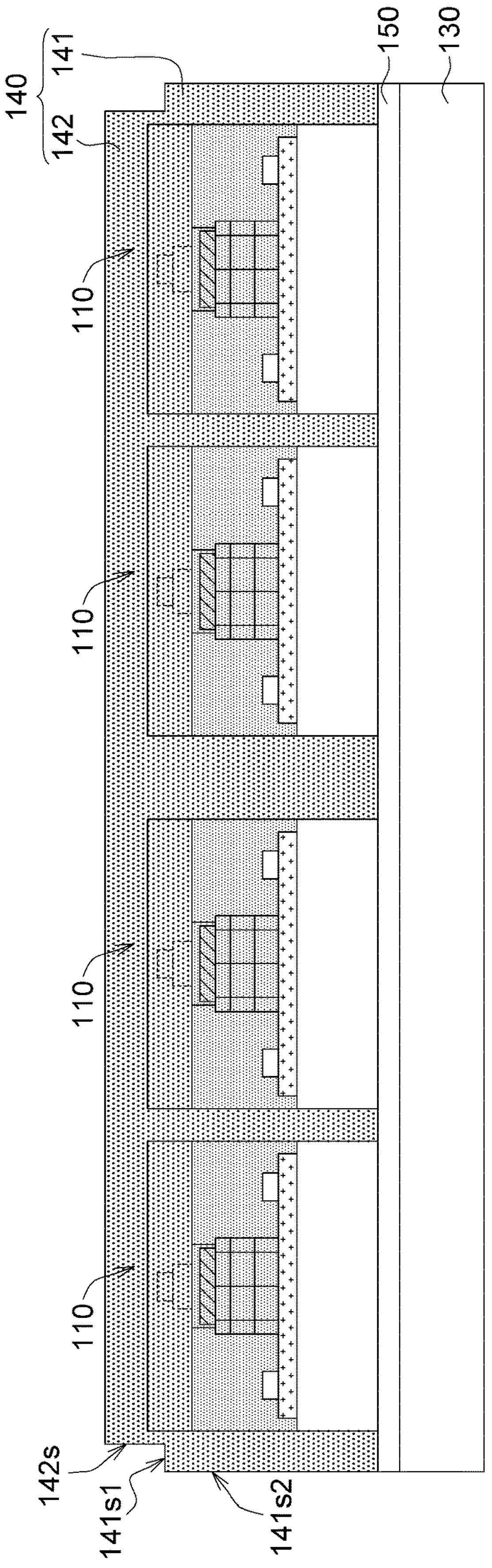

As illustrated in FIG. 8B, the insulation layer 140 is formed on the carrier 130 (or the bonding layer 150) and encapsulates the light-emitting components 110. The insulation layer 140 includes the first insulation portion 141 and the second insulation portion 142, wherein the second insulation portion 142 protrudes with respect to the surface 141*s*1 of the first insulation portion 141. The second insulation portion 142 is, for example, an island disposed on the first insulation portion 141. Furthermore, the second insulation portion 142 has the first lateral surface 142*s*, wherein first the lateral surface 142*s* is recessed with respect to the second lateral surface 141*s*2 of the first insulation portion 141 to form the second insulation portion 142. In an embodiment, the surface 141*s*1 and the second lateral surface 142*s* are formed by using, for example, cutting, compression molding, injection molding, transfer molding, etc.

Figure 8C:
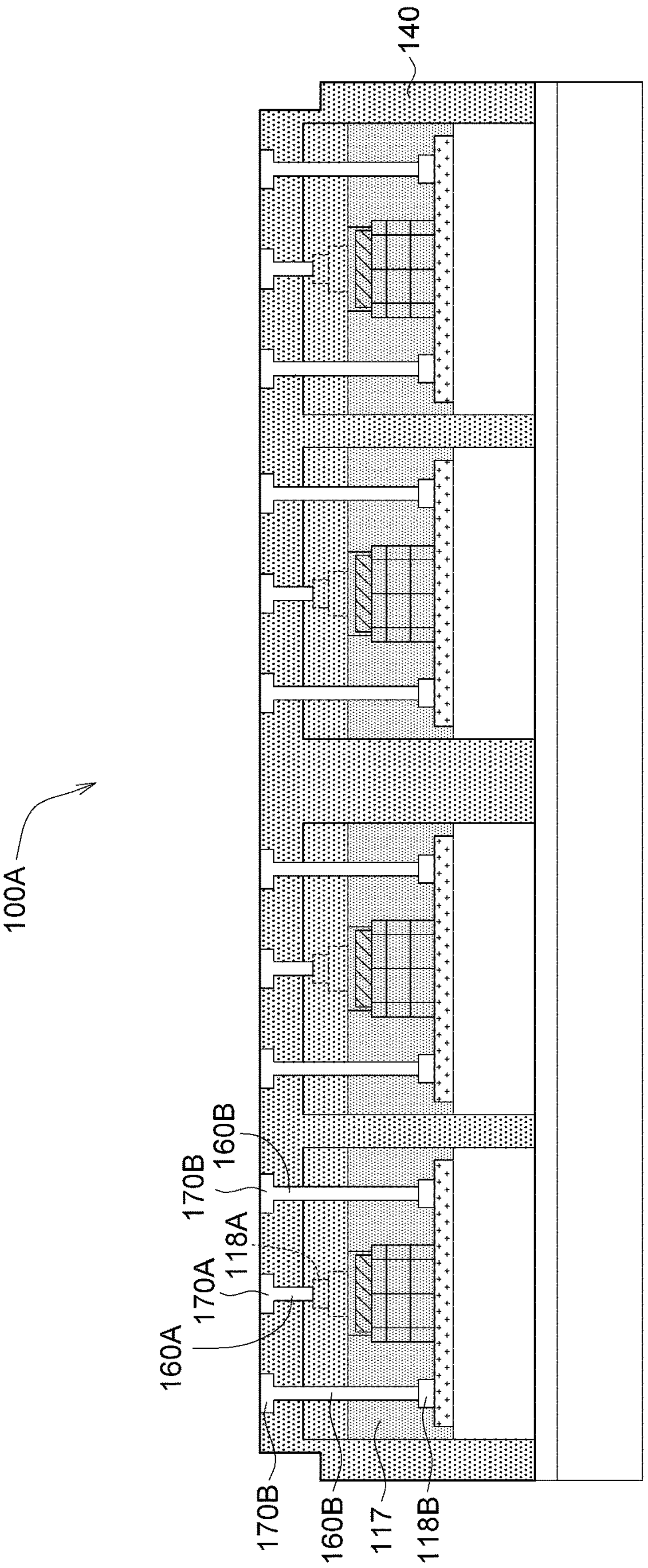

As illustrated in FIG. 8C, for each light-emitting component 110, at least one first conductive via 160A, at least one second conductive via 160B, at least one first pad 170A and at least one second pad 170B are formed on the light-emitting component 110 to form the light-emitting module 100A, wherein the first conductive via 160A passes through the insulation layer 140 of the light-emitting component 110 to contact with the first pad 118A, the second conductive via 160B passes through the insulation layer 140 and the insulation layer 117 of the light-emitting component 110 to contact with the second pad 118B, the first pad 170A connects the first conductive via 160A and exposed from the insulation layer 140, and the second pad 170B connects the second conductive via 160B and exposed from the insulation layer 140. In an embodiment, the first conductive via 160A, the second conductive via 160B, the first pad 170A and the second pad 170B are formed by using, for example, plating.

Figure 8D:
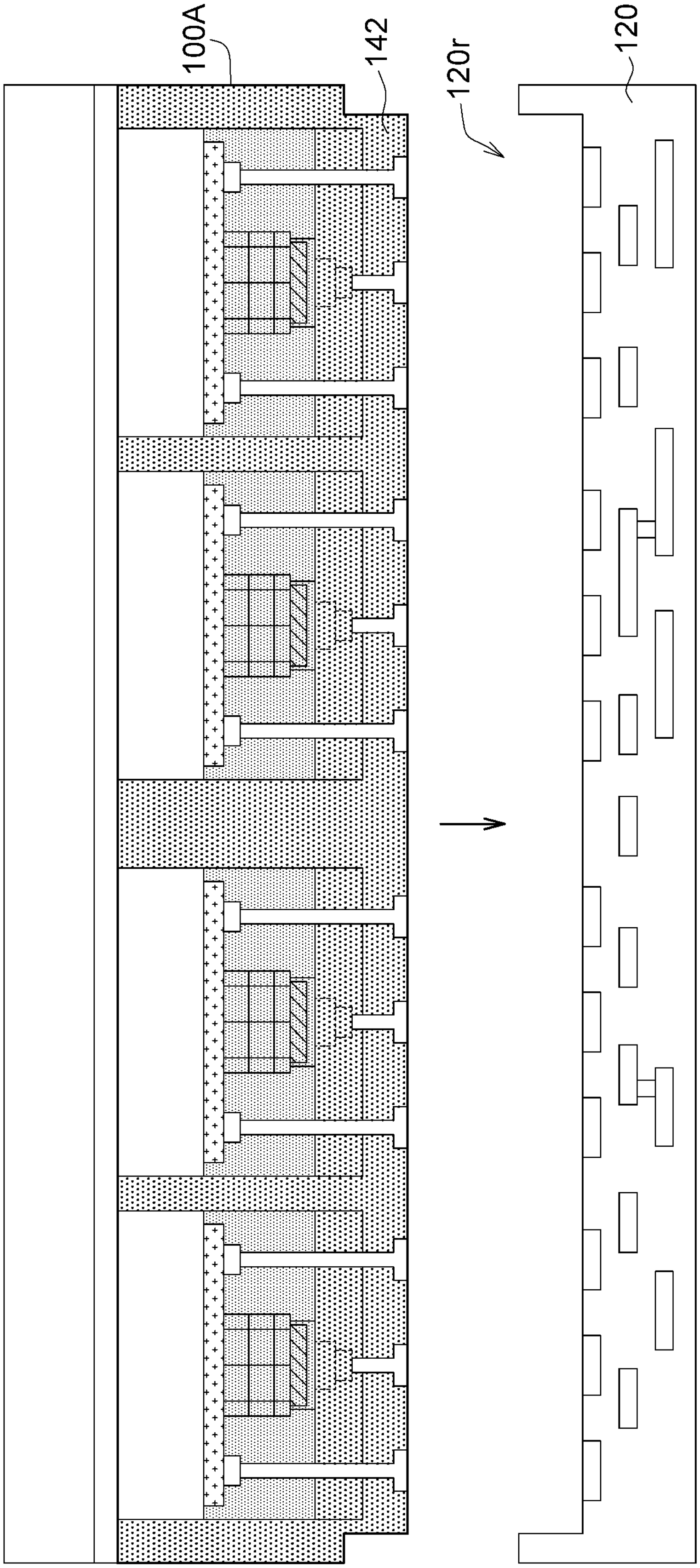

As illustrated in FIG. 8D, the light-emitting module 100A of FIG. 8C is disposed on and electrically connected to the photonic integrated circuit 120A, wherein the photonic integrated circuit 120A has the recess 120*r*, and the second insulation portion 142 is located within the recess 120*r* of the photonic integrated circuit 120A. So far, the photonic semiconductor device 100 of FIG. 1B is formed or completed.

Referring to FIGS. 9A to 9E, FIGS. 9A to 9E illustrate schematic diagrams of processes of the photonic semiconductor device 200 of FIG. 3B.

Figure 9A:
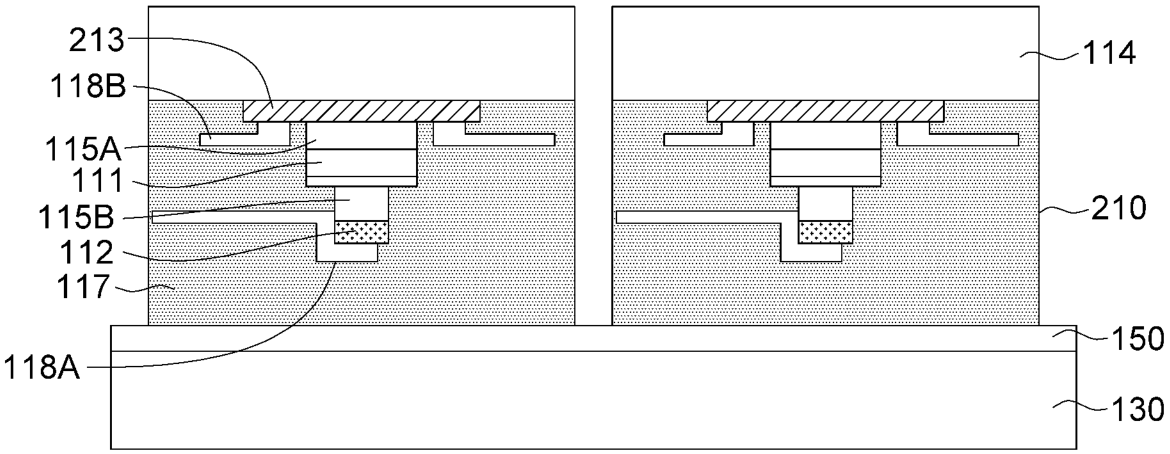
FIGS. 9A to 9E illustrate schematic diagrams of processes of the photonic semiconductor device of FIG. 3B.

As illustrated in FIG. 9A, at least one light-emitting component 210 of FIG. 4C formed on the substrate 114 is disposed on the carrier 130 through the bonding layer 150. Each light-emitting component 210 includes the gain medium layer 111, the first contact layer 112, the first optical coupling layer 213, at least one first buffer layer 115A, at least one second buffer layer 115B, the insulation layer 117, at least one first pad 118A and at least one second pad 118B are formed on the substrate 114.

Figure 9B:
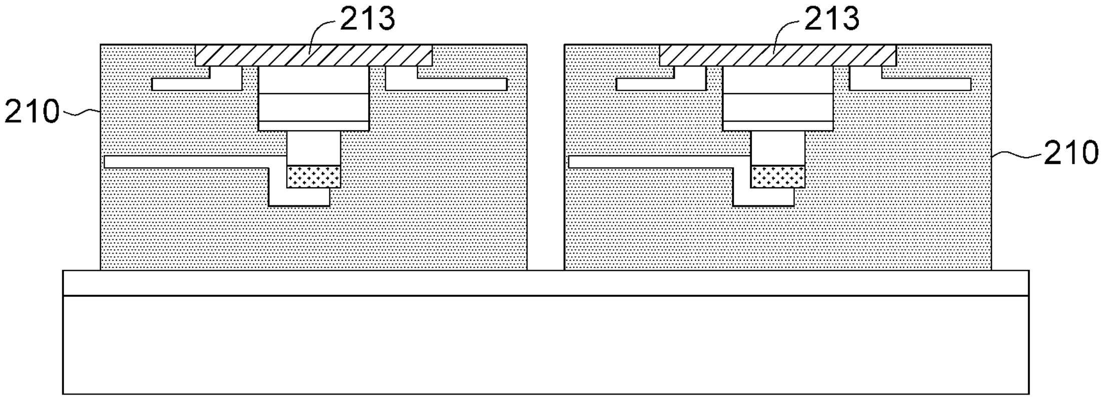

As illustrated in FIG. 9B, the substrate 114 is removed from the corresponding light-emitting component 210 to expose the first optical coupling layer 213. In an embodiment, the substrate 114 is removed by using, for example, CMP (Chemical-Mechanical Planarization), etching, etc.

Figure 9C:
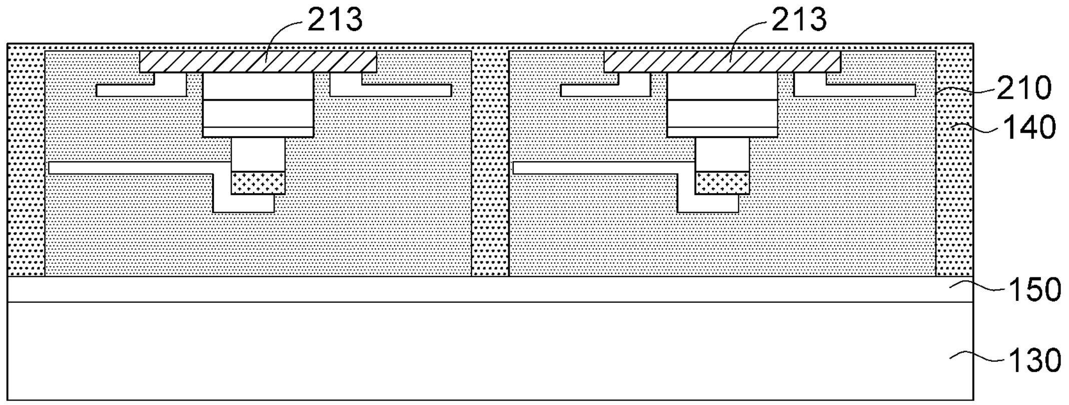

As illustrated in FIG. 9C, the insulation layer 140 is formed on the carrier 130 and encapsulates the light-emitting components 210.

Figure 9D:
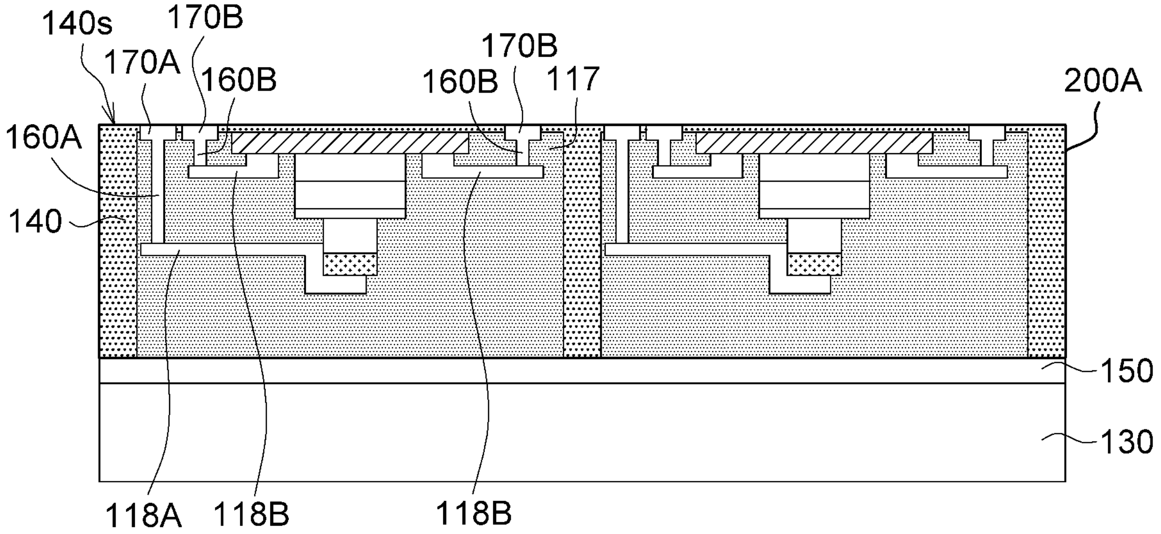

As illustrated in FIG. 9D, for each light-emitting component 210, at least one first conductive via 160A, at least one second conductive via 160B, at least one first pad 170A and at least one second pad 170B are formed on the light-emitting component 110 to form the light-emitting module 200A, wherein the first conductive via 160A passes through the insulation layer 117 of the light-emitting component 210 to contact with the first pad 118A of the light-emitting components 210, the second conductive via 160B passes through the insulation layer 117 of the light-emitting component 210 to contact with the second pad 118B of the light-emitting components 210, the first pad 170A connects the first conductive via 160A and exposed from the insulation surface 140*s* of the insulation layer 140, and the second pad 170B connects the second conductive via 160B and exposed from the insulation surface 140*s* of the insulation layer 140. In an embodiment, the first conductive via 160A, the second conductive via 160B, the first pad 170A and the second pad 170B are formed by using, for example, plating.

Figure 9E:
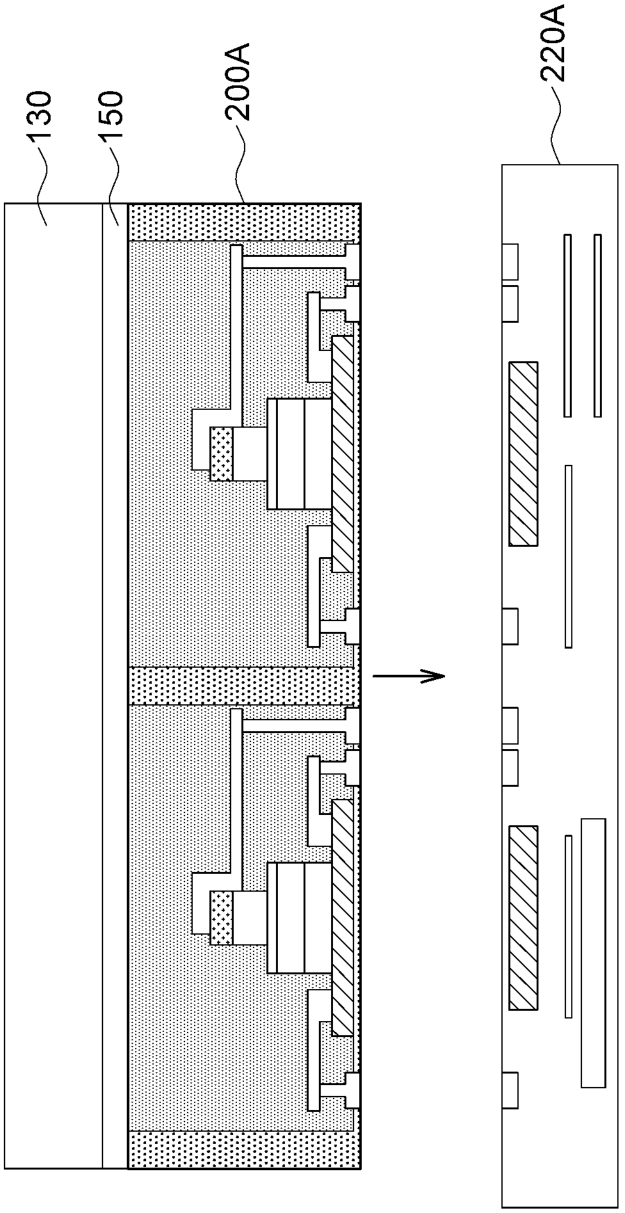

As illustrated in FIG. 9E, the light-emitting module 200A of FIG. 9D with the bonding layer 150 and the carrier 130 is disposed on and electrically connected to the photonic integrated circuit 220A. So far, the photonic semiconductor device 200 of FIG. 3B is formed or completed.

Referring to FIGS. 10A to 10E, FIGS. 10A to 10E illustrate schematic diagrams of processes of the photonic semiconductor package 10 of FIG. 5.

Figure 10A:
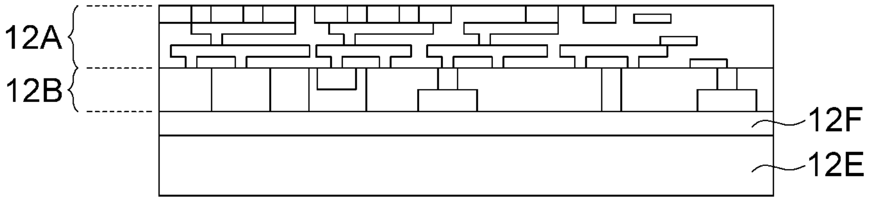
FIGS. 10A to 10E illustrate schematic diagrams of processes of the photonic semiconductor package of FIG. 5.

As illustrated in FIG. 10A, the waveguide layer 12B is formed on a Si substrate (for example, wafer) 12E through an adhesive layer 12F, and the FEOL circuit 12A is formed above the waveguide layer 12B.

Figure 10B:
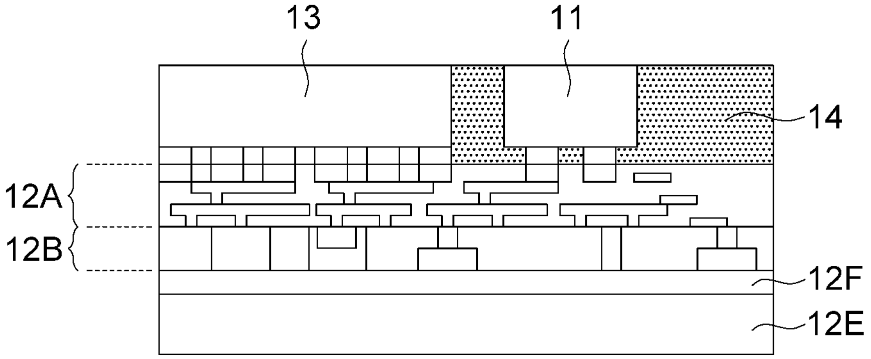

As illustrated in FIG. 10B, at least one light-emitting component 11 and at least one electronic integrated circuit 13 are disposed on and electrically connected to the FEOL circuit 12A, and the insulation layer 14 is formed on the FEOL circuit 12A and encapsulates the light-emitting component 11 and the electronic integrated circuit 13. The insulation layer 14 exposes the upper surface of the light-emitting component 11 and the upper surface of the photonic integrated circuit 13.

Figure 10C:
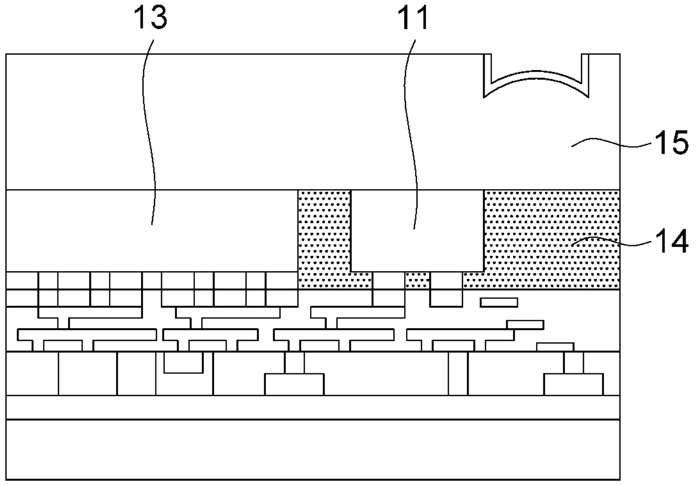

As illustrated in FIG. 10C, the optical lens 15 is disposed on the insulation layer 14 and the exposed light-emitting component 11 and the photonic integrated circuit 13.

Figure 10D:
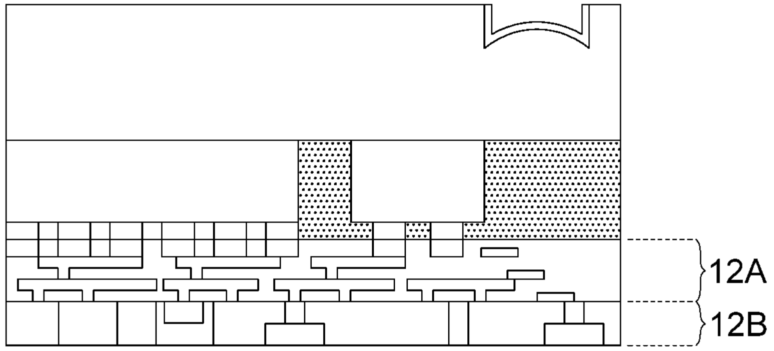

As illustrated in FIG. 10D, the Si substrate 12E and the adhesive layer 12F of FIG. 10C are removed to expose the waveguide layer 12B. In an embodiment, the Si substrate 12E and the adhesive layer 12F are removed by using, for example, CMP, etching, tearing off, etc.

Figure 10E:
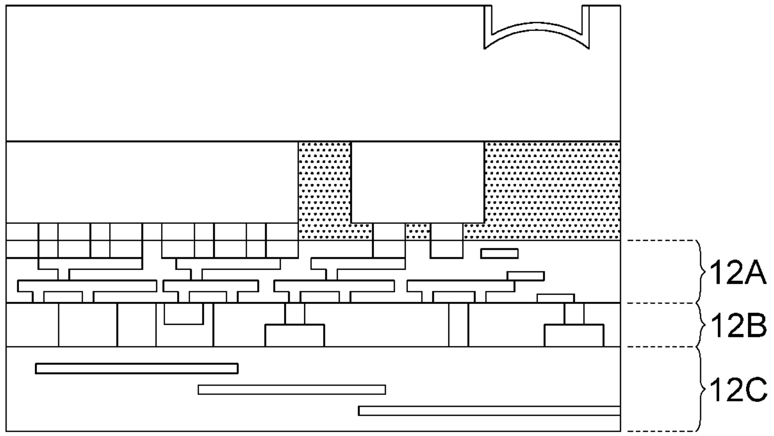

As illustrated in FIG. 10E, the backside layer 12C is formed on the waveguide layer 12B.

Then, at least one conductive via 12D of FIG. 5 passing through the waveguide layer 12B and the backside layer 12C is formed to electrically connect the FEOL circuit 12A. Then, at least one contact 16 electrically connected with the conductive via 12D is disposed beneath the backside layer 12C. So far, the photonic semiconductor package 10 of FIG. 5 is formed or completed.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize.

These modifications may be made to the disclosure in light of the above detailed description. The terms used in the following claims should not be construed to limit the disclosure to the specific implementations disclosed in the specification and the claims. Rather, the scope of the disclosure is to be determined entirely by the following claims, which are to be construed in accordance with established doctrines of claim interpretation.

According to the present disclosure, a photonic semiconductor device including a light-emitting component and a photonic integrated circuit is provided. The light-emitting component at least includes a gain medium layer, a first contact layer and a first optical coupling layer stacked to each other. The photonic integrated circuit includes a second optical coupling layer. The light-emitting component and the photonic integrated circuit are stacked in a stacking direction, the first optical coupling layer has a first taper portion, the second optical coupling layer has a second taper portion, and the first taper portion and the second taper portion overlap in the stacking direction. Accordingly, the light emitted from the gain medium layer may be transmitted to the second taper portion from the first taper portion by optical coupling in a short length of an optical coupling path.

Example embodiment 1: a photonic semiconductor device includes a light-emitting component and a photonic integrated circuit. The light-emitting component, includes a gain medium layer, a first contact layer and a first optical coupling layer stacked to each other. The photonic integrated circuit includes a second optical coupling layer. The light-emitting component and the photonic integrated circuit are stacked in a stacking direction, the first optical coupling layer has a first taper portion, the second optical coupling layer has a second taper portion, and the first taper portion and the second taper portion overlap in the stacking direction.

Example embodiment 2 based on Example embodiment 1: the first contact layer is a P-type contact, the first optical coupling layer is a waveguide layer, the light-emitting component further includes a N-type contact, and the P-type contact and the N-type contact are disposed on the opposite two sides of the waveguide layer.

Example embodiment 3 based on Example embodiment 1: the first contact layer and the first optical coupling layer are located at the same side of the gain medium layer.

Example embodiment 4 based on Example embodiment 1: photonic semiconductor device further includes an insulation layer covering the light-emitting component and including a first insulation portion and a second insulation portion protruding with respect to a surface of the first insulation portion.

Example embodiment 5 based on Example embodiment 4: the photonic integrated circuit has a recess, and the second insulation portion is located within the recess.

Example embodiment 6 based on Example embodiment 1: the photonic integrated circuit has a surface, the recess is recessed with respect to the surface, the first optical coupling layer and the second optical coupling layer are disposed adjacent to the surface.

Example embodiment 7 based on Example embodiment 1: the photonic semiconductor device further includes a carrier and a bonding layer, and the light-emitting component is disposed on the carrier through the bonding layer.

Example embodiment 8 based on Example embodiment 1: the first optical coupling layer is exposed from the photonic semiconductor device.

Example embodiment 9 based on Example embodiment 1: the light-emitting component includes an insulation layer, and the insulation layer encapsulates the gain medium layer and the first contact layer, but exposes the first optical coupling layer.

Example embodiment 10 based on Example embodiment 9: the insulation layer has an insulation surface, the first optical coupling layer has a coupling surface, and the insulation surface and the coupling surface are flush with each other.

Example embodiment 11 based on Example embodiment 1: the first contact layer is a P-type contact, and the first optical coupling layer is a N-type contact.

Example embodiment 12 based on Example embodiment 11: the P-type contact and the N-type contact are located at the opposite two sides of the gain medium layer.

Example embodiment 13 based on Example embodiment 1: the gain medium layer has a coupling portion, the first taper portion protrudes with respect to the coupling portion.

Example embodiment 14: a photonic semiconductor package includes a photonic semiconductor device, an electronic integrated circuit and an optical lens. The photonic semiconductor device includes a light-emitting component and an electronic integrated circuit. The light-emitting component includes a gain medium layer, a first contact layer and a first optical coupling layer stacked to each other. The photonic integrated circuit includes a second optical coupling layer. The electronic integrated circuit is disposed on the photonic integrated circuit. The optical lens is disposed over the electronic integrated circuit and the light-emitting component. The light-emitting component and the photonic integrated circuit are stacked in a stacking direction, the first optical coupling layer has a first taper portion, the second optical coupling layer has a second taper portion, and the first taper portion and the second taper portion overlap in the stacking direction.

Example embodiment 15 based on Example embodiment 14: the first contact layer is a P-type contact, the first optical coupling layer is a waveguide layer, the light-emitting component further includes a N-type contact, and the P-type contact and the N-type contact are disposed on the opposite two sides of the waveguide layer.

Example embodiment 16 based on Example embodiment 14: the first contact layer is a P-type contact, and the first optical coupling layer is a N-type contact.

Example embodiment 17 based on Example embodiment 14: the photonic semiconductor package further includes an insulation layer covering the light-emitting component and including a first insulation portion and a second insulation portion protruding with respect to a surface of the first insulation portion. The photonic integrated circuit has a recess, and the second insulation portion is located within the recess.

Example embodiment 18: A manufacturing method of a photonic semiconductor device includes: providing a light-emitting component, wherein the light-emitting component includes a gain medium layer, a first contact layer and a first optical coupling layer stacked to each other, and the first optical coupling layer has a first taper portion; providing a photonic integrated circuit, wherein the photonic integrated circuit includes a second optical coupling layer including a second taper portion; and disposing the light-emitting component on the photonic integrated circuit, wherein the light-emitting component and the photonic integrated circuit are stacked in a stacking direction, and the first taper portion and the second taper portion overlap in the stacking direction.

Example embodiment 19 based on Example embodiment 18: the manufacturing method further includes: disposing the light-emitting component on a carrier through a bonding layer; and forming an insulation layer on the carrier to encapsulate the light-emitting component, wherein the insulation layer includes a first insulation portion and a second insulation portion, and the second insulation portion protrudes with respect to the first insulation portion. In disposing the light-emitting component on the photonic integrated circuit, the second insulation portion is located within a recess of the photonic integrated circuit.

Example embodiment 20 based on Example embodiment 18: in providing the light-emitting component, the gain medium layer, the first contact layer and the first optical coupling layer is formed on a substrate. The manufacturing method further includes: disposing the light-emitting component on a carrier through a bonding layer; and removing the substrate from the light-emitting component.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A manufacturing method of a photonic semiconductor device, comprising:

providing a light-emitting component, wherein the light-emitting component comprises a gain medium layer, a first contact layer and a first optical coupling layer stacked to each other, and the first optical coupling layer has a first taper portion;

providing a photonic integrated circuit, wherein the photonic integrated circuit comprises a second optical coupling layer comprising a second taper portion; and disposing the light-emitting component on the photonic integrated circuit, wherein the light-emitting component and the photonic integrated circuit are stacked in a stacking direction, and the first taper portion and the second taper portion overlap in the stacking direction;

wherein in providing the photonic integrated circuit, the photonic integrated circuit comprises a FEOL (Front End of Line) circuit layer having a recess; the manufacturing method further comprises:

forming an insulation layer to encapsulate the light-emitting component;

in disposing the light-emitting component on the photonic integrated circuit, a portion of the insulation layer is located within the recess of the photonic integrated circuit.

2. The manufacturing method as claimed in claim 1, further comprising:

disposing the light-emitting component on a carrier through a bonding layer; and forming the insulation layer on the carrier to encapsulate the light-emitting component, wherein the insulation layer comprises a first insulation portion and a second insulation portion, and the second insulation portion protrudes with respect to the first insulation portion;

wherein in disposing the light-emitting component on the photonic integrated circuit, the second insulation portion is located within the recess of the photonic integrated circuit.

3. The manufacturing method as claimed in claim 1, wherein in providing the light-emitting component, the gain medium layer, the first contact layer and the first optical coupling layer are formed on a substrate; the manufacturing method further comprising:

disposing the light-emitting component on a carrier through a bonding layer; and removing the substrate from the light-emitting component.

4. The manufacturing method as claimed in claim 1, wherein in providing the light-emitting component, the first contact layer is a P-type contact, the first optical coupling layer is a waveguide layer, the light-emitting component further comprises a N-type contact, and the P-type contact and the N-type contact are disposed on the opposite two sides of the waveguide layer.

5. The manufacturing method as claimed in claim 1, wherein in providing the light-emitting component, the first contact layer and the first optical coupling layer are located at the same side of the gain medium layer.

6. The manufacturing method as claimed in claim 2, where in disposing the light-emitting component on the photonic integrated circuit, the photonic integrated circuit has a surface, the recess is recessed with respect to the surface, the first optical coupling layer and the second optical coupling layer are disposed adjacent to the surface.

7. The manufacturing method as claimed in claim 1, wherein the first optical coupling layer is exposed from the photonic semiconductor device.

8. The manufacturing method as claimed in claim 2, wherein in forming the insulation layer on the carrier to encapsulate the light-emitting component, the insulation layer encapsulates the gain medium layer and the first contact layer, but exposes the first optical coupling layer.

9. The manufacturing method as claimed in claim 8, wherein in forming the insulation layer on the carrier to encapsulate the light-emitting component, the insulation layer has an insulation surface, the first optical coupling layer has a coupling surface, and the insulation surface and the coupling surface are flush with each other.

10. The manufacturing method as claimed in claim 1, wherein in providing the light-emitting component, the first contact layer is a P-type contact, and the first optical coupling layer is a N-type contact.

11. The manufacturing method as claimed in claim 10, wherein in providing the light-emitting component, the P-type contact and the N-type contact are located at the opposite two sides of the gain medium layer.

12. The manufacturing method as claimed in claim 1, wherein in providing the light-emitting component, the gain medium layer has a coupling portion, the first taper portion protrudes with respect to the coupling portion.

13. A manufacturing method of a photonic semiconductor device, comprising:

providing a light-emitting component, wherein the light-emitting component comprises a gain medium layer and a first optical coupling layer having a first taper portion, the gain medium layer has a coupling portion, and the first taper portion protrudes with respect to the coupling portion;

providing a photonic integrated circuit, wherein the photonic integrated circuit comprises a second taper portion; and disposing the light-emitting component on the photonic integrated circuit, wherein the light-emitting component and the photonic integrated circuit are stacked in a stacking direction, and the first taper portion and the second taper portion overlap in the stacking direction;

wherein in providing the photonic integrated circuit, the photonic integrated circuit comprises a FEOL circuit layer having a recess; the manufacturing method further comprises:

forming an insulation layer to encapsulate the light-emitting component;

in disposing the light-emitting component on the photonic integrated circuit, a portion of the insulation layer is located within the recess of the photonic integrated circuit.

14. The manufacturing method as claimed in claim 13, further comprising:

disposing the light-emitting component on a carrier through a bonding layer; and forming an insulation layer on the carrier to encapsulate the light-emitting component, wherein the insulation layer comprises a first insulation portion and a second insulation portion, and the second insulation portion protrudes with respect to the first insulation portion;

wherein in disposing the light-emitting component on the photonic integrated circuit, the second insulation portion is located within the recess of the photonic integrated circuit.

15. The manufacturing method as claimed in claim 13, wherein in providing the light-emitting component, the gain medium layer and the first optical coupling layer are formed on a substrate; the manufacturing method further comprising:

disposing the light-emitting component on a carrier through a bonding layer; and removing the substrate from the light-emitting component.

16. The manufacturing method as claimed in claim 14, where in disposing the light-emitting component on the photonic integrated circuit, the photonic integrated circuit has a surface, the recess is recessed with respect to the surface, the first optical coupling layer and a second optical coupling layer of the photonic integrated circuit are disposed adjacent to the surface.

17. The manufacturing method as claimed in claim 13, wherein the first optical coupling layer is exposed from the photonic semiconductor device.

18. A manufacturing method of a photonic semiconductor device, comprising:

providing a light-emitting component, wherein the light-emitting component comprises a gain medium layer, a P-type contact, a N-type contact and a waveguide layer having a first taper portion, the gain medium layer has a coupling portion, the first taper portion protrudes with respect to the coupling portion, and the P-type contact and the N-type contact are disposed on the opposite two sides of the waveguide layer;

providing a photonic integrated circuit, wherein the photonic integrated circuit comprises a second taper portion; and disposing the light-emitting component on the photonic integrated circuit, wherein the light-emitting component and the photonic integrated circuit are stacked in a stacking direction, and the first taper portion and the second taper portion overlap in the stacking direction;

wherein in providing the photonic integrated circuit, the photonic integrated circuit comprises a FEOL circuit layer having a recess; the manufacturing method further comprises:

forming an insulation layer to encapsulate the light-emitting component;

in disposing the light-emitting component on the photonic integrated circuit, a portion of the insulation layer is located within the recess of the photonic integrated circuit.

19. The manufacturing method as claimed in claim 18, further comprising:

disposing the light-emitting component on a carrier through a bonding layer; and forming the insulation layer on the carrier to encapsulate the light-emitting component, wherein the insulation layer comprises a first insulation portion and a second insulation portion, and the second insulation portion protrudes with respect to the first insulation portion;

wherein in disposing the light-emitting component on the photonic integrated circuit, the second insulation portion is located within the recess of the photonic integrated circuit.

20. The manufacturing method as claimed in claim 18, wherein in providing the light-emitting component, the P-type contact and the waveguide layer are located at the same side of the gain medium layer.

* * * * *